United States Patent

[11] 3,524,419

| [72] | Inventors | Frederic H. Middleton<br>Honolulu, Hawaii;<br>Warren O. Gibson, Kaneohe, Hawaii;<br>Leonard H. Anderson, Honolulu, Hawaii |
|---|---|---|
| [21] | Appl. No. | 740,569 |
| [22] | Filed | June 27, 1968 |
| [45] | Patented | Aug. 18, 1970 |
| [73] | Assignee | Hawaiian Sugar Planters' Association<br>Honolulu, Hawaii<br>a voluntary, non-profit agricultural organization |

[54] METHOD AND APPARATUS FOR TRANSPLANTING PLANTS
27 Claims, 16 Drawing Figs.

[52] U.S. Cl. .................................................. 111/2,
47/37, 111/85
[51] Int. Cl. ...................................................... A01c 11/02
[50] Field of Search ........................................... 111/1-3;
47/1, 37; 111/85

[56] References Cited
UNITED STATES PATENTS

| 2,625,122 | 1/1953 | Carelock ...................... | 111/3 |
| 2,961,979 | 11/1960 | Stanley et al. ................. | 111/3 |
| 3,306,239 | 2/1967 | Martin .......................... | 111/1 |
| 3,374,752 | 3/1968 | Shirozu ........................ | 111/2 |
| 3,446,164 | 5/1969 | Huang et al. ................... | 111/3 |

FOREIGN PATENTS

| 634,508 | 1/1962 | Canada | .................. | 111/2 |
| 1,143,359 | 2/1963 | Germany | ................ | 111/2 |
| 174,874 | 11/1965 | U.S.S.R. | ................. | 111/2 |

*Primary Examiner*— Robert E. Bagwill
*Attorney*—Burns, Doane, Benedict, Swecker and Mathis ABSTRACT: A method which is intended to transplant plants of the type wherein each plant includes root portions surrounded by an individual plug of earth enclosed within a separate container for each plant. The method utilizes vehicle means adapted for motion on the ground and includes an initial step of storing a plurality of the plants on the vehicle means. The plants are conveyed at least one at a time from storage to a planting station on the vehicle from which each plant may subsequently be delivered to the ground. The container is automatically removed from each plant during passage of the plant from storage to the planting station.

An apparatus which is intended for transplanting plants of the type wherein each plant includes root portions surrounded by an individual plug of earth enclosed within a separate container for each plant. The apparatus includes vehicle means adapted for motion along the ground with the vehicle means being provided with a planting station at which plants may be planted in the ground. Storage means fixedly connected with the vehicle means is adapted to store a plurality of the plants. At least one of the plants at a time is conveyed from the storage means to the planting station along a predetermined path by conveying means. During passage along the predetermined path the container is removed from each plant by container removing means connected with the vehicle means.

INVENTORS
FREDERIC H. MIDDLETON
WARREN O. GIBSON
LEONARD H. ANDERSON
ATTORNEYS

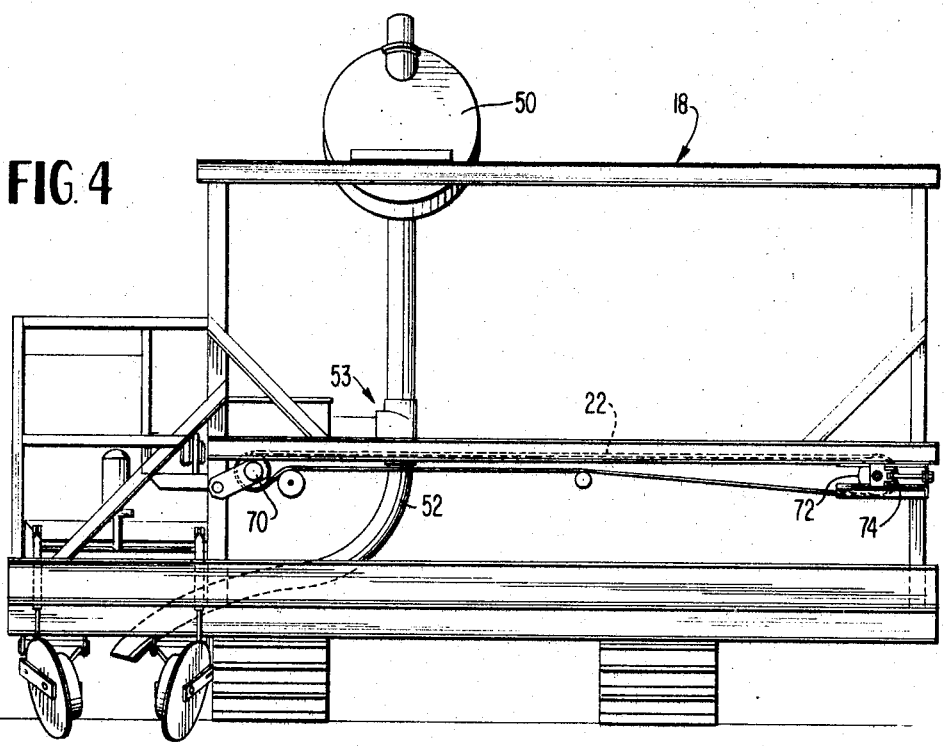
FIG. 4
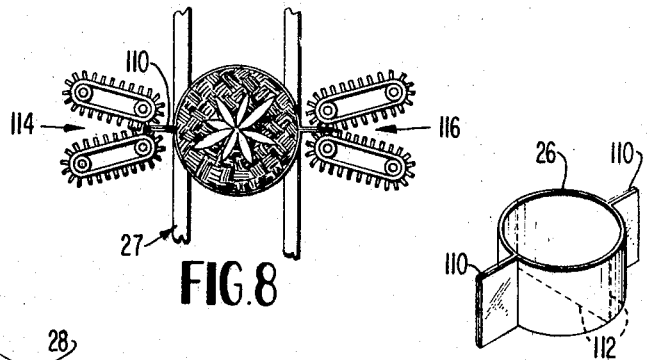
FIG. 8
FIG. 7
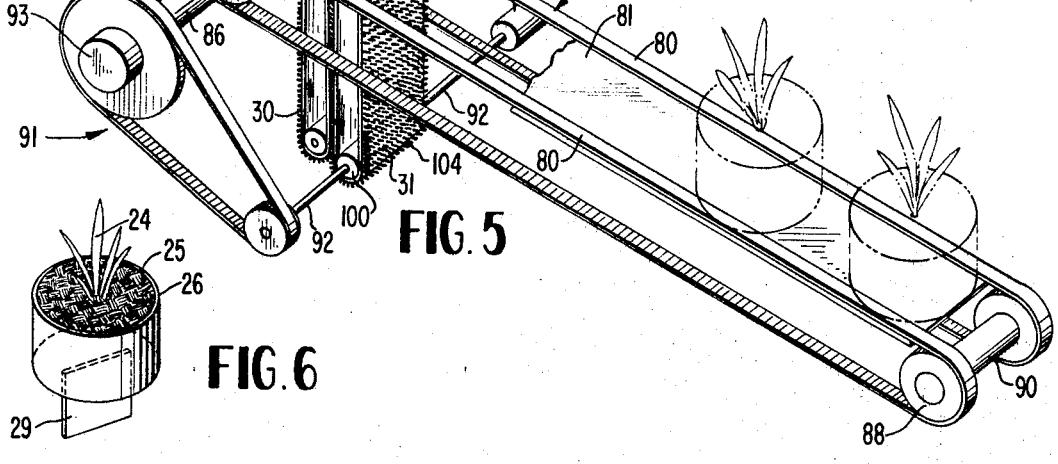
FIG. 5
FIG. 6

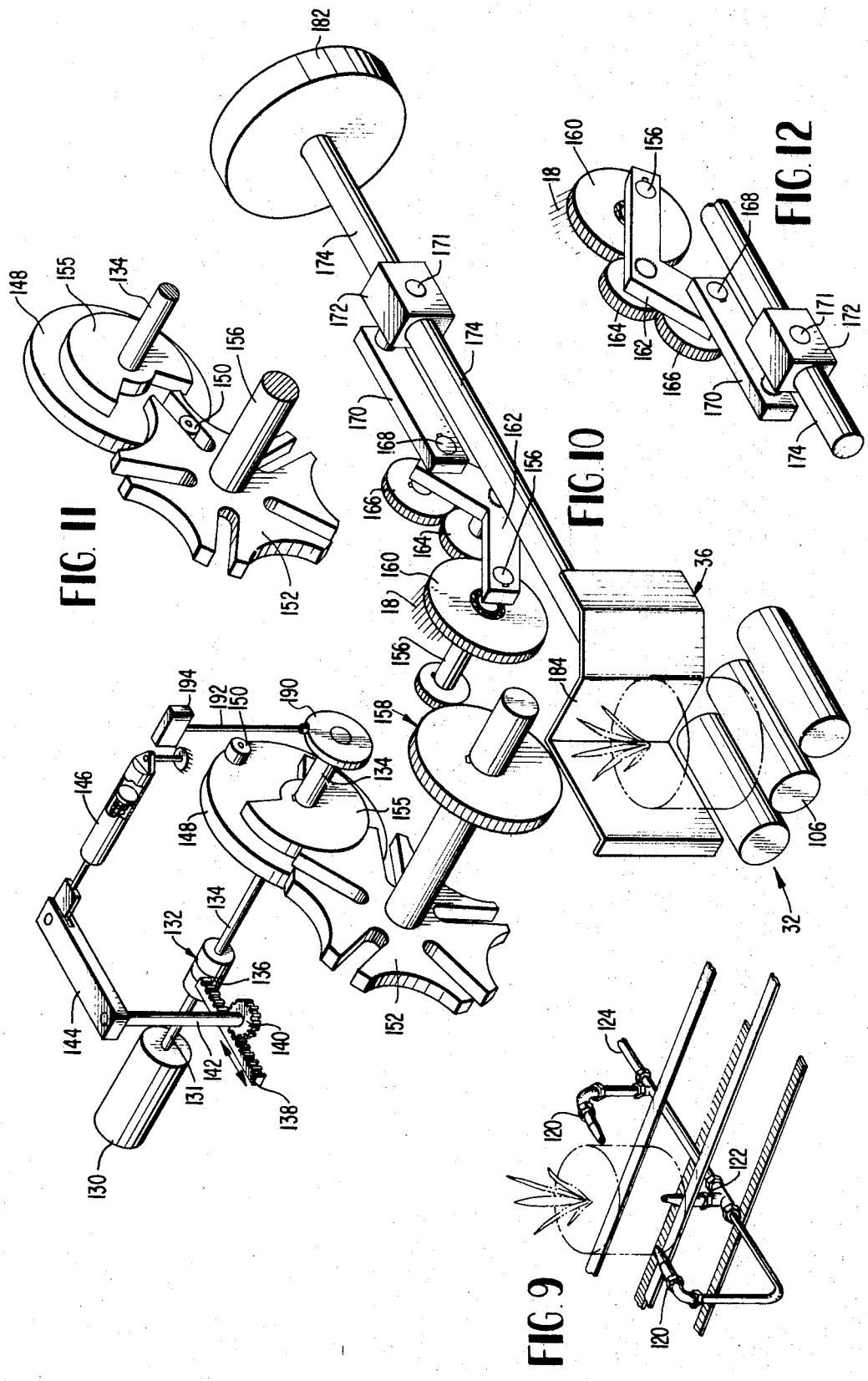

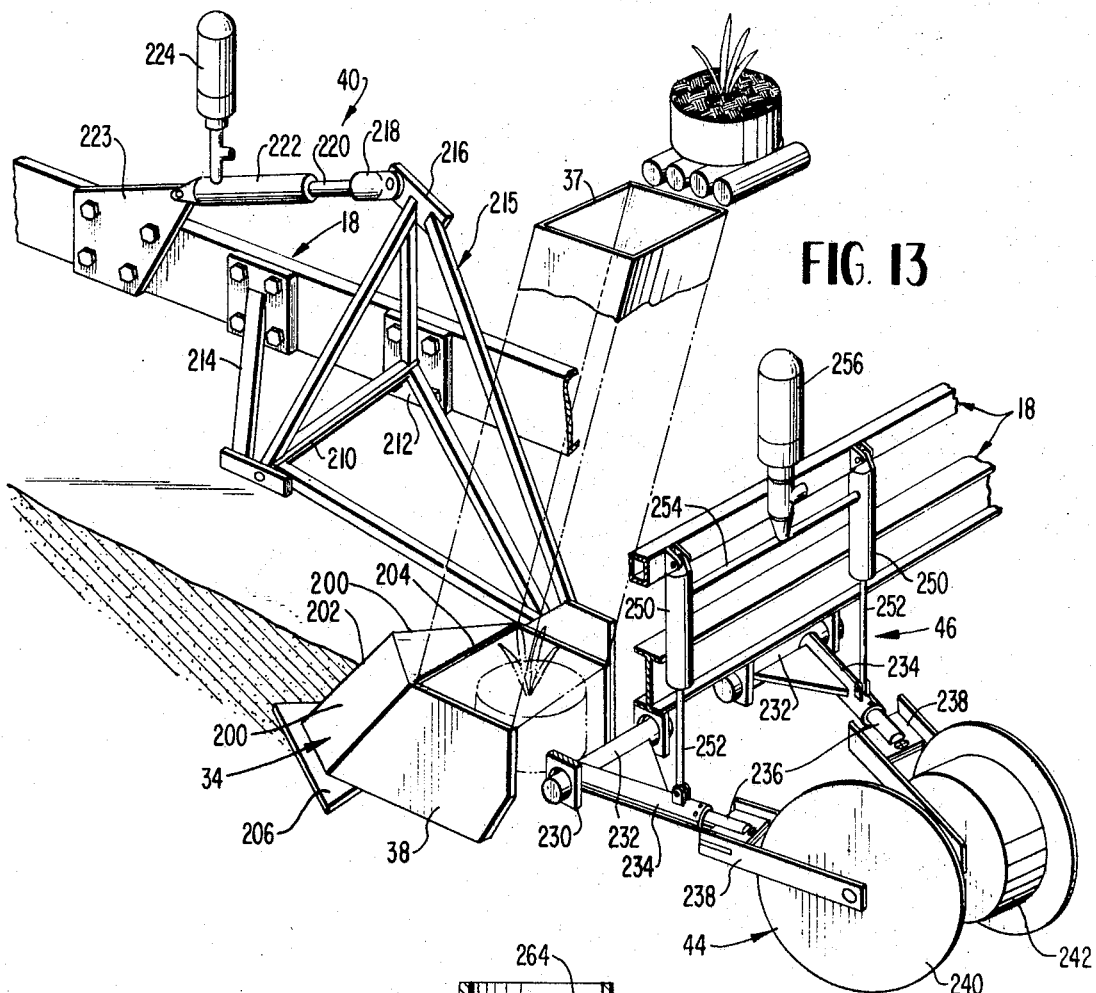
FIG. 13
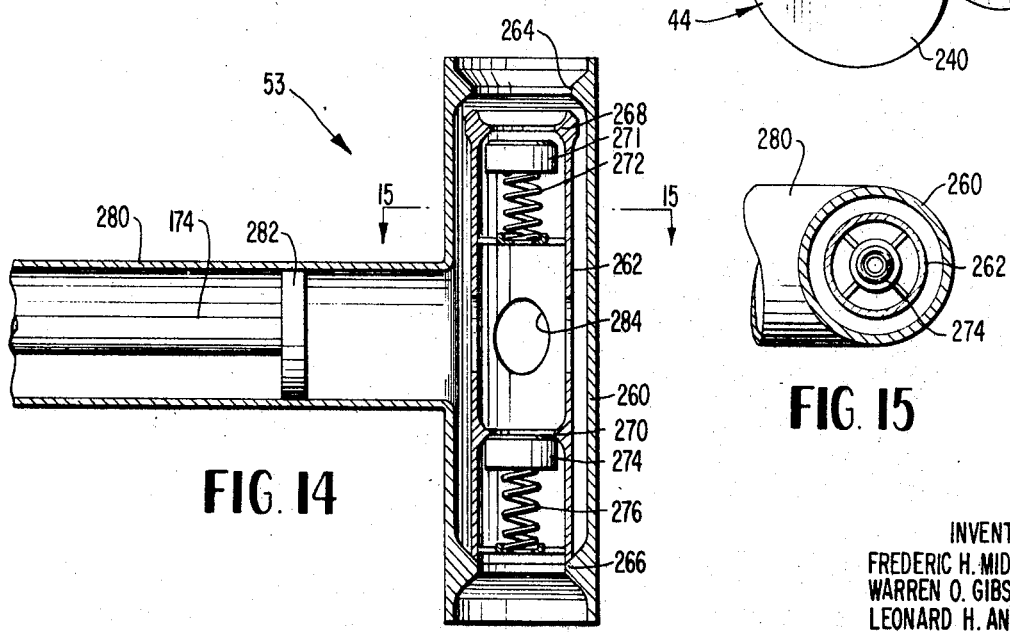
FIG. 14
FIG. 15
INVENTORS
FREDERIC H. MIDDLETON
WARREN O. GIBSON
LEONARD H. ANDERSON
BY
Burns, Doane, Benedict, Swecker & Mathis
ATTORNEYS

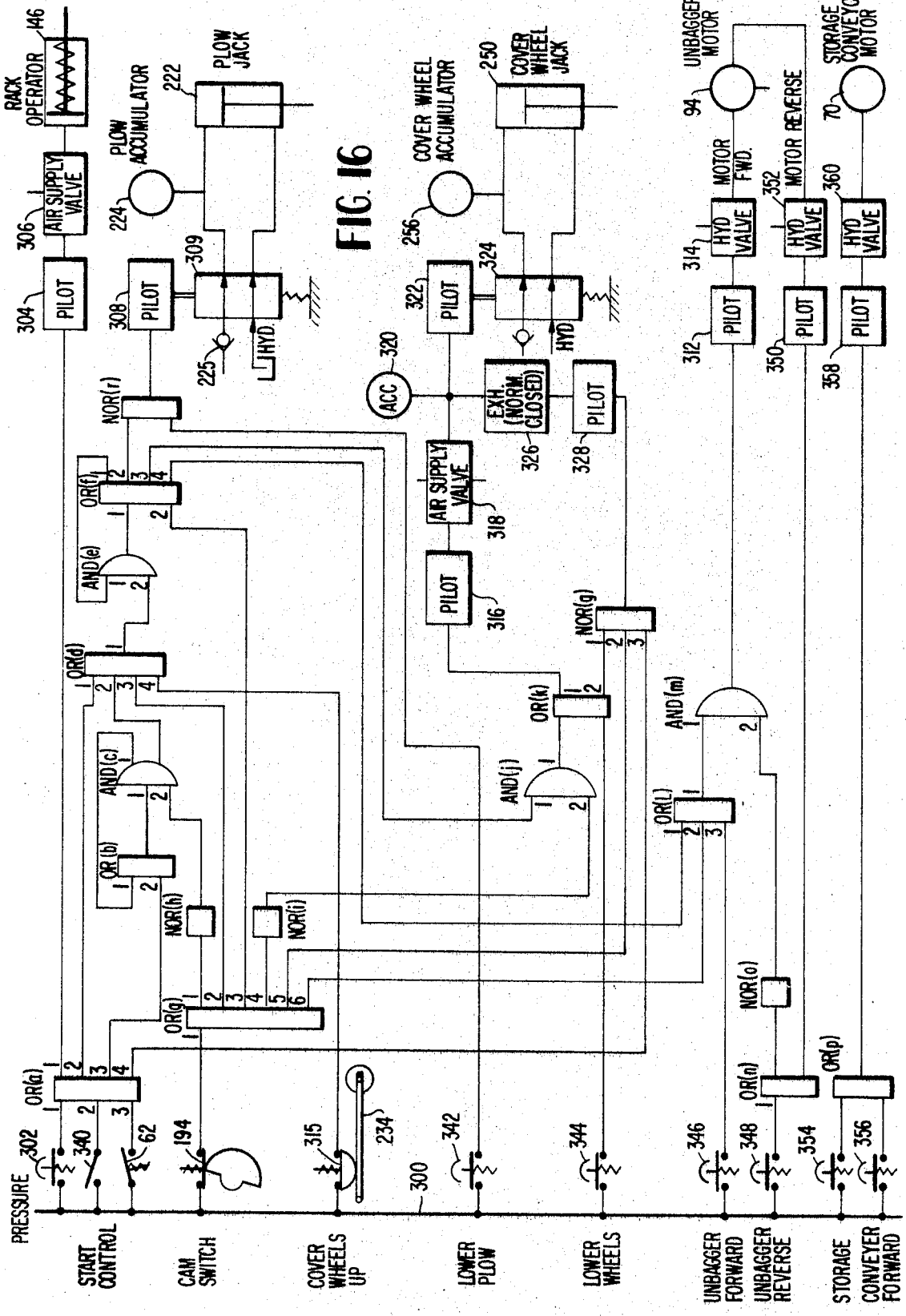

METHOD AND APPARATUS FOR TRANSPLANTING PLANTS

BACKGROUND OF INVENTION

This invention relates to a method and apparatus for transplanting plants such as nursery grown seedlings. In particular, the invention relates to a method and apparatus for transplanting seedlings of the type wherein each seedling includes root portions surrounded by an individual plug of earth enclosed within a separate container for each plant and wherein it is necessary that the container be removed from the seedling before it is planted in the ground.

In many plant raising operations, it has been found that important economic advantages in terms of increased crop yield per unit time of growth in the field are provided, if the plants are initially grown as seedlings under nursery conditions with subsequent transplanting of the seedlings into the open fields, This practice is becoming of increasing interest in connection with the planting of sugarcane seedlings, with reference to which the present invention will be primarily described. However, it will be appreciated that the method and apparatus of the present invention may equally be employed with many other forms of plant other than sugarcane seedlings.

As the transplanting of seedlings, if performed by hand, tends to be a laborious operation, various machines have hitherto been developed for the purpose of transplanting seedlings. Typically, such machines have comprised a self-propelled vehicle provided with a storage compartment into which seedlings from the nursery are loaded. A conveyor may be provided on the vehicle for moving the seedlings from the storage compartment to a planting station on the vehicle. At suitable intervals, plants may be moved from the planting station by a plant dispensing unit into a furrow in the ground produced by a plow connected to the vehicle. After a plant has been planted in the furrow, the earth may be closed around the plant by cover wheels connected with the vehicle traveling behind the plow. In an additional refinement, water dispensing units are sometimes provided for delivering water to the plant at the time of planting.

Although often satisfactory, prior machines of the type described may, however, sometimes prove unsatisfactory for a variety of reasons.

One particular problem arises when transplanting seedlings which have been grown from seed in individual containers such as bags, this being a common practice to avoid later problems of separating the seedlings from each other. With this arrangement, however, each seedling has its roots surrounded by an individual plug of earth enclosed within a separate bag for each seedling and it is necessary to insure that this bag does not constrict the subsequent growth of the seedling roots when the seedling is transplanted into the open fields. It has, therefore, been common to utilize bags formed of decomposable material such as paper, peat moss, or bagasse, but such decomposable bags have been found to impose a significant additional cost upon the transplanting operation.

To avoid this expense, it has been proposed to utilize instead, low-cost, plastic bags which must be removed from the root portions of the seedlings prior to planting them in the ground. Unfortunately, removal of the plastic bags is frequently performed by hand which causes a significant increase in labor costs and, in addition, may significantly slow down the rate at which seedlings may be transplanted.

It would, therefore, be desirable to provide a transplanting system which could utilize low-cost plastic bags for the seedlings but wherein the plastic bags could be automatically and mechanically removed prior to planting, at reduced cost.

Another problem associated with transplanting apparatus of the type previously described above may arise if the transplanting machine is designed only for a sustained sequence of automatic repetitive operations in which the plow and the cover wheels remain permanently engaged with the ground and the plants are planted at regular intervals. With this construction, the apparatus would not be suitable for subsequent replacement of individual plants in already planted rows (such as is necessary for example to replace diseased seedlings in a row) as the plow would uproot the preceding, healthy seedlings in the already planted row.

Further disadvantages of the prior apparatus may sometimes arise in connection with delivery of the water to the plant at the time of planting. Earlier transplanting machines have frequently utilized relatively costly, rotary pumping apparatus to deliver the water thus increasing the total capital cost of the planting apparatus. Additionally, such pumping equipment may afford inadequate control of the volume of water delivered to each plant, with the result that it may be necessary to provide an unnecessarily large water reservoir on the vehicle in order to avoid running out of water before transplanting operations are completed.

Other problems associated with the previous transplanting machines may sometimes arise in connection with the various controls and actuators utilized to coordinate the various conveying, plowing and watering functions of the transplanting machine. Such controls and actuators often comprise mechanical lever systems which may tend to be heavy and awkward to operate and subject to friction and rusting.

In addition, such mechanical systems sometimes fail to make any provision for unusually high impact loads imposed upon the plow and covering wheels by embedded obstructions in the ground, with the result that serious damage to these units may occur.

SUMMARY OF INVENTION

It is, therefore, a general object of the invention to provide a method and apparatus for transplanting, which obviates or minimizes problems of the type generally noted above.

It is a particular object of the invention to provide a method and apparatus for transplanting plants of the type wherein each plant has its root portions surrounded by an individual plug of earth enclosed within a separate container for each plant, which provides for automatic removal of each container from its associated plant prior to planting.

It is another object of the invention to provide a method and apparatus for transplanting plants of the type described which is capable of performing sustained automatic planting of plants in regular sequence or individual planting of separate plants at selected predetermined locations with equal facility.

It is another object of the invention to provide a method and apparatus for transplanting seedlings which is capable of delivering a uniform amount of water to the seedling at the time of planting utilizing a low-cost pumping system.

It is yet another object of the invention to provide a transplanting apparatus for transplanting seedlings wherein the operations of the apparatus are controlled by fluidic circuitry so as to provide high reliability and minimized control input loads.

A transplanting apparatus according to a preferred embodiment of the invention is intended to accomplish at least some of the foregoing objects. The apparatus is adapted to transplant plants of the type wherein each plant includes root portions surrounded by an individual plug of earth enclosed within a separate container for each plant. The transplanting apparatus includes vehicle means adapted for motion along the ground. A planting station is provided on the vehicle means from which plants delivered to the planting station may be planted in the ground. Storage means is fixedly connected with the vehicle means for storing a plurality of the plants. The plants may be conveyed at least one at a time from the storage means along a predetermined path to the planting station by conveying means connected with the vehicle means. Container removal means is connected with the vehicle means adapted to automatically remove the container from each plant during conveyance of the plant along the predetermined path.

It will be appreciated that this apparatus enables the use of inexpensive plastic bags in connection with the transplanting of seedlings by ensuring that each bag is automatically, mechanically stripped from the plant prior to planting.

In a further apparatus aspect of the invention, ground opening means is connected with the vehicle means. The ground opening means is adapted to produce an opening in the ground adjacent the planting station so as to receive the plants delivered therefrom. The ground opening means includes plow means adapted to produce a furrow in the ground upon motion of the vehicle means along the ground.

Significantly, the plow means may be selectively raised and lowered as would be necessary, for example, to permit the plow means to pass over a preceding already planted seedling in a row when the apparatus is being utilized for replacing seedlings in the row.

To cover the earth about each plant after it has been received within the furrow produced by the plow means, a pair of cover wheels are connected with the vehicle spaced behind the plow means. The cover wheels may be selectively raised and lowered during replanting of plants in a row in a similar manner to the plow means.

To avoid damage to either the plow means or the cover wheels due to impact with any embedded obstruction in the ground, plow safety unit means permit the plow and cover respectively to move vertically upon such impact to avoid damage to them or to the rest of the transplanting apparatus.

In yet a further apparatus aspect of the invention, watering means is provided on the vehicle means for delivering a uniform charge of water to each plant upon planting of it. The watering means incorporates a particularly effective reciprocating pump adapted to deliver a standard charge of water each time a plant is dispensed.

The invention also embraces various method sequences for transplanting plants.

One significant method sequence is intended to transplant plants of the type wherein each plant includes root portions surrounded by an individual plug of earth enclosed within a separate container for each plant. The method utilizes vehicle means adapted for motion along the ground. The method includes an initial step of storing a plurality of the plants on the vehicle means. The plants are conveyed at least one at a time from storage to a planting station in the vehicle from which each plant may subsequently be delivered to the ground. During passage of the plant from storage to the planting station, the container associated with the plant is automatically removed to place the plant in condition for immediate planting.

In another method aspect of the invention, an additional step of creating an opening in the ground adjacent the planting station on the vehicle is performed, so that each plant may be received in an opening in the ground.

Additionally, the opening provided in the ground may be subsequently refilled with earth after the plant has been delivered into the opening.

Another method aspect of the invention is intended to supply an adequate quantity of water to each plant on planting thereof to assist in its rapid recovery from the transplanting operation. For this purpose, the plant is delivered from the planting station to the ground at some time subsequent to removal of the container from the plant. A predetermined quantity of water is then delivered to the ground closely adjacent the plant delivered from the planting station.

THE DRAWINGS

A transplanting apparatus according to a preferred embodiment of the invention is illustrated in the accompanying drawings in which:

FIGURE 4 is a rear, end view of the transplanting apparatus shown in FIGURE 1;

FIGURE 5 is a schematic, perspective view of a container removal apparatus forming a part of the apparatus shown in FIGURE 1;

FIGURE 6 is a perspective view of a container or bag for the roots of a plant, suitable for use with the container removal apparatus shown in FIGURE 5;

FIGURE 7 is a perspective view of an alternative embodiment of the bag for the plant;

FIGURE 8 is a schematic top view of an alternative embodiment of the container removal apparatus type suitable for use with the alternative embodiment of the bag apparatus shown in FIGURE 7;

FIGURE 9 is a schematic, perspective view of another alternative embodiment of the unbagging apparatus;

FIGURE 10 is a schematic perspective view of a plant dispensing unit forming a part of the apparatus shown in FIGURE 1;

FIGURE 11 is a perspective view of a Geneva gear and driving wheel forming a part of the plant dispensing unit shown in FIGURE 10;

FIGURE 12 is a schematic perspective view of a Cardan unit forming another part of the plant dispensing unit shown in FIGURE 10;

FIGURE 13 is a perspective view of a plow and a pair of cover wheels forming a part of the apparatus shown in FIGURE 1;

FIGURE 14 is a cross-sectional side view of a water pump forming a part of the apparatus shown in FIGURE 1;

FIGURE 15 is a cross-sectional top view of a portion of the water pump shown in FIGURE 14 taken along lines 15-15 therein; and FIGURE 16 is a simplified schematic diagram of a fluidic control circuit utilized to coordinate the operations of the apparatus shown in FIGURE 1.

DETAILED DESCRIPTION

General summary

Figure 1:
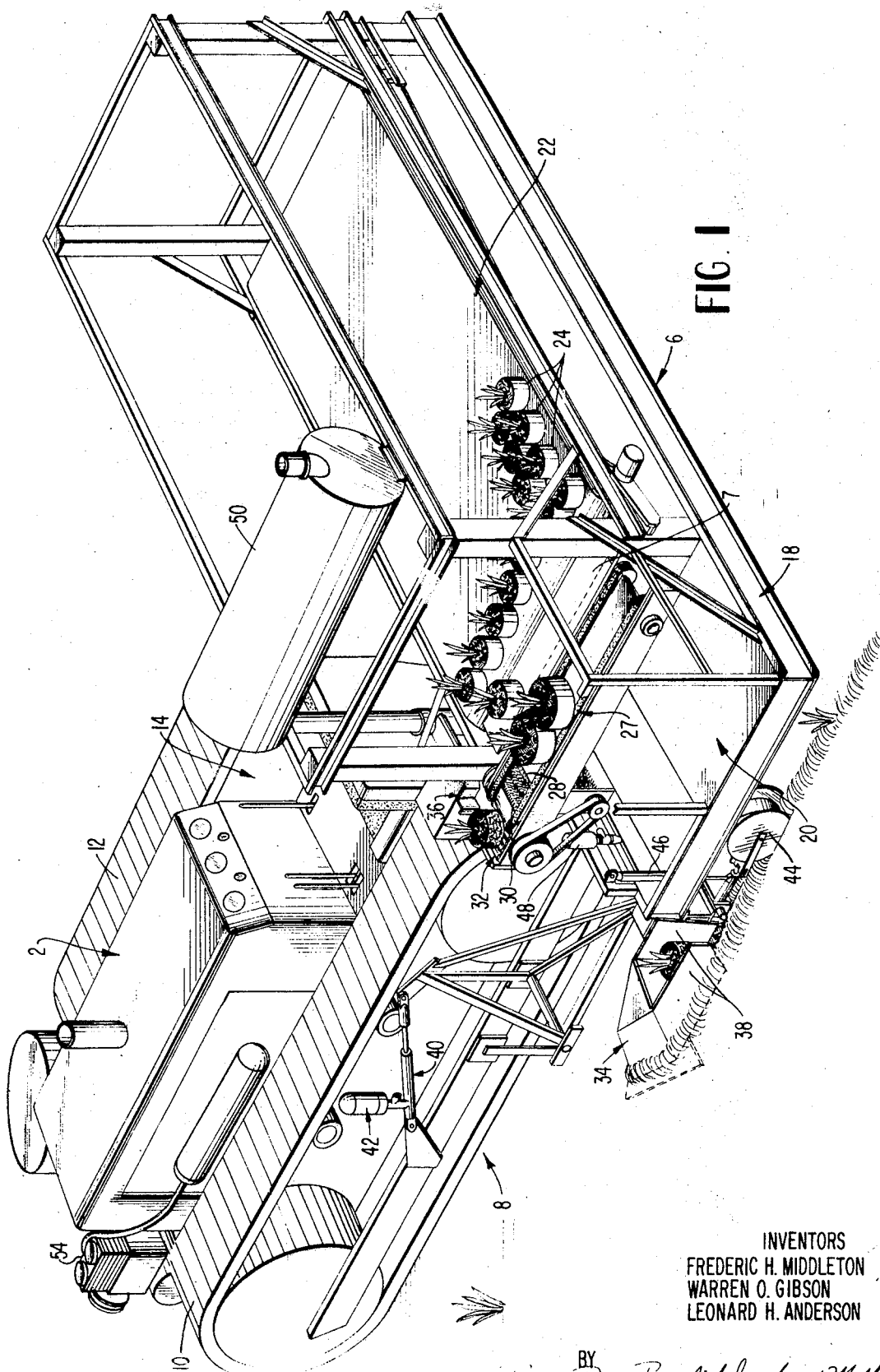
FIGURE 1 is a perspective view of a transplanting apparatus according to one preferred embodiment of the invention.

Referring to FIGURE 1 of the drawings, a transplanting apparatus constructed in accordance with a preferred embodiment of the invention is there shown.

The transplanting apparatus includes a self-propelled tractor vehicle 2 of conventional construction having left and right endless tracks 10 and 12, respectively, for moving the tractor along the ground and a driving station 14 for the driver. Secured to the tractor vehicle 2 is a general supporting structure, designated 18.

It will be understood that the various rollers, shafts and other components to be described hereinafter are maintained in their relative positions to each other and mounted for rotation as appropriate by connection to suitable adjacent portions of the general surrounding structure 18, unless specifically described to the contrary.

An operator's platform 20 on which an operator for the transplanting equipment may stand is provided on the general structure 18 positioned to the left and rearwardly of the tractor 2.

Plants 24 to be transplanted (which may be sugarcane seedlings) from a nursery, are stacked on a storage conveyor 22 which extends transversely and rearwardly of the tractor 2. Each of the plants 24 (FIGURE 6) has its roots surrounded by an individual, generally cylindrical plug of earth 25 enclosed within a separate container in the form of a bag 26 for each plant. The storage conveyor 22 (FIGURE 1) may be selectively controlled by the operator to move plants to the left end of the storage conveyor 22 within the grasp of the operator's hand.

The operator moves plants from the left end of the conveyor 22 by hand onto a selectively operated forwardly moving, longitudinally extending unbagging conveyor 27 comprising two transversely spaced parallel belts positioned adjacent the left extremity of the storage conveyor. The unbagging conveyor 27 carries each plant over an opening 28 through which a flap 29 (FIGURE 6) on the base of each bag projects downwardly. The unbagging conveyor 27 advances each plant over a pair of adjacent vertically mounted stripping belts 30 and 31 (FIGURE 5) projecting into the opening 28, to cause the flap 29 on the bottom of the bag associated to become nipped between the stripping belts 30 and 31 pulled downwardly off the plug of earth surrounding the plant roots. To assist removal of the bag, the plants are usually watered prior to transplanting so that the earth plug surrounding each root portion is in a moist, slippery condition. The plant 24, once the bag has been removed, is then advanced to a planting station 32 (FIGURE 1) where the plant remains until it is desired to be planted.

It will be appreciated that the arrangement described provides a transplanting system which renders possible the utilization of low-cost plastic bags about the plant roots by providing for automatic, mechanical removal of the bags from the plants prior to planting. The use of such low-cost plastic bags enabled by the present invention permits substantial economies to be made in plant rearing operations involving nursery-grown seedlings.

To provide a furrow in the ground within which each unbagged plant may be planted, a plow 34 is connected to other portions of the general supporting structure 18.

Each plant is dispensed from the holding station 32 into the furrow by a pusher-like plant dispensing member 36 which is advanced transversely across the holding station 32 to push the plant into a chute 37 (shown only in FIGURE 13 for clarity). The chute 37 extends downwardly to two spaced side plates 38 secured to and extending behind the plow 34 to provide an entry point to the furrow.

During automatic planting operations in a previously unplanted field, the plow 34 remains permanently in a down position engaged with the ground to dig the aforementioned furrow. However, during replanting operations in a previously planted row to replace individual, dying or otherwise unsatisfactory plants, the plow 34 may be selectively raised above the ground by a plow mounting mechanism 40 to pass over previously planted healthy plants which it is not desired to uproot.

After the plant has been planted in the furrow, earth is pushed back around the plant and compressed about it by a pair of cover wheels 44 (FIGURE 13) which follow behind the plow on opposite sides of the furrow. The cover wheels 44 are held down in continuous contact with the ground during automatic continuous planting, by a cover wheel mounting mechanism 46 connected with other portions of the general structure 18. However, during replanting operations, the cover wheels 44 may be selectively raised and lowered to pass over previously planted healthy plants in a similar manner to the plow.

Additionally, to protect the plow 34 and the cover wheels 44 against damage upon impact with an embedded, ground obstruction, each of the previously mentioned plow and cover wheel mounting mechanisms 40 and 46 incorporates hydraulically biased yielding structure (as will be described) to permit separate upward deflection of the plow and cover wheels, respectively, from the obstruction.

To permit rapid recovery of the plants subsequent to the transplanting process it is usually advisable to supply water to each plant at the time of replanting. For this purpose a water reservoir 50 (FIGURE 4) supported by the general structure 18, is in fluid communication with a water conduit 52 having its outlet positioned adjacent the point of plant delivery. A water pump 53 interposed in the conduit 52 is operatively interconnected with the previously mentioned plant dispensing member 36 to cause a uniform amount of water to be delivered to the plant after it has been moved into the furrow.

THE VEHICLE AND PLANT STORAGE UNIT

The previously mentioned vehicle 2 (FIGURE 1) is a conventional, endless track type tractor vehicle, powered by an internal combustion engine. In the preferred embodiment the vehicle 2 may comprise a tractor vehicle of a type manufactured by the Caterpillar Company of Peoria, Ill.

The vehicle 2 includes a hydraulic pump and reservoir system (not shown) of conventional kind driven by the engine to provide a source of hydraulic power for various hydraulic services hereafter to be mentioned. Additionally, an air compressor 54 for providing a supply of air under pressure for various pneumatic services is driven by the tractor engine and is mounted at the forward end of the tractor 2.

Figure 3:
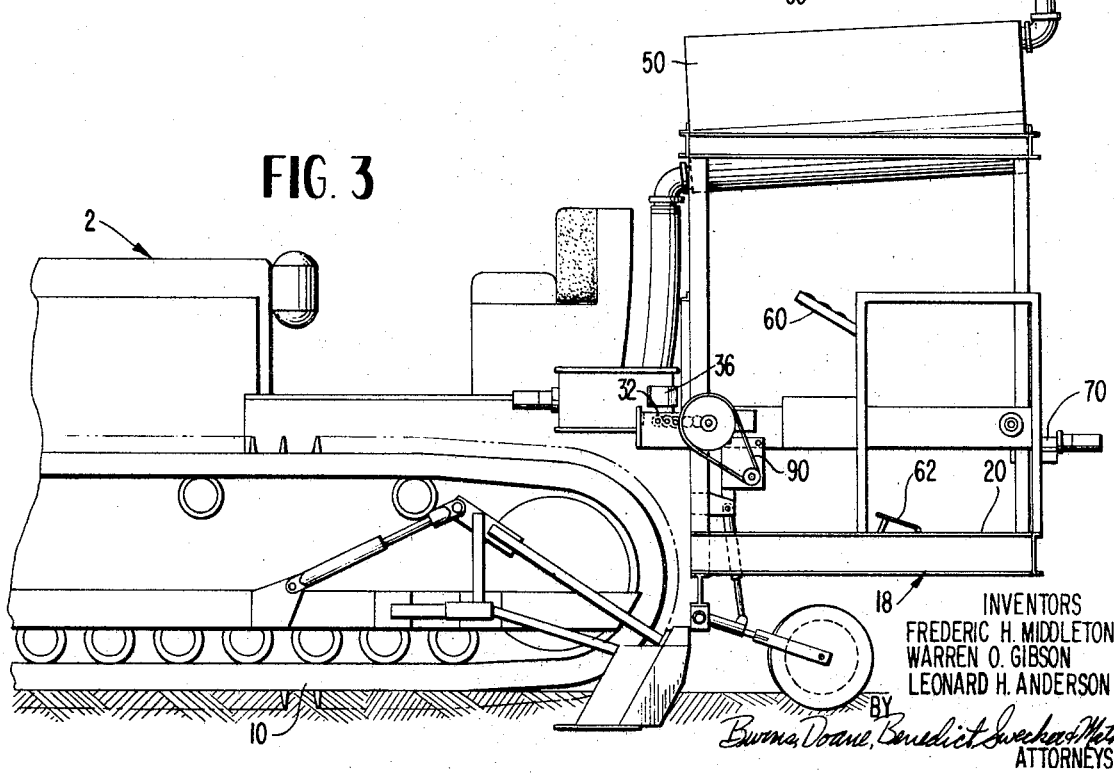
FIGURE 3 is a left, side view of the portion of the transplanting apparatus shown in FIGURE 2.

The previously mentioned operator's platform supported by the general supporting structure 18, is positioned at such a height as to place the head of an operator standing on the platform 20 generally on a level with the head of a seated driver of the vehicle, for ease of verbal communication between them. In addition, the operator's platform is spaced to the left of the left track 10 of the vehicle to give the operator a clear field of view down the row. The operator standing on the operator's platform 20 has positioned before him at about waist height a control panel 60 (FIGURE 3) on which are mounted various switches and palm buttons (to be described) for controlling the operation of the transplanting apparatus. Additionally, a foot switch 62 is mounted on the operator's platform 20 in suitable positon for operation by the operator's right foot.

The plants 24 are stored, as previously described, on the upper surface of the storage conveyor 22. The storage conveyor 22 is a conventional, endless flexible belt, conveyor having a horizontally supported flat upper surface on which the plants are supported.

The storage conveyor 22 at its left end extends in driven relation about the output shaft of an hydraulic motor 70 (FIGURE 4) which is powered by hydraulic fluid delivered from the previously described engine hydraulic system. The operation of the hydraulic motor 70 may be selectively controlled to drive the upper surface of the storage conveyor 22 to the left as desired.

At its right end, the storage conveyor 22 passes about a tensioning roll 72 which may be moved transversely of the general supporting structure 18 by a conventional slide mechanism 74 to maintain a predetermined degree of tautness of the storage conveyor 22. Suitable other conventional rolls for maintaining the horizontal disposition and configuration of the storage conveyor 22 are provided.

The storage conveyor 22 extends transversely to the right beyond the right track 10 (FIGURE 1) of the tractor vehicle 2 and is of fairly substantial width so that the total area of the upper surface of the storage conveyor is large enough to store a substantial number of plants. The storage capacity of the unit is sufficient to permit the transplanting apparatus to be operated for sustained periods without requiring reloading. In addition, the storage conveyor is sufficiently rigidly supported to support at least a double layer of plants.

Figure 2:
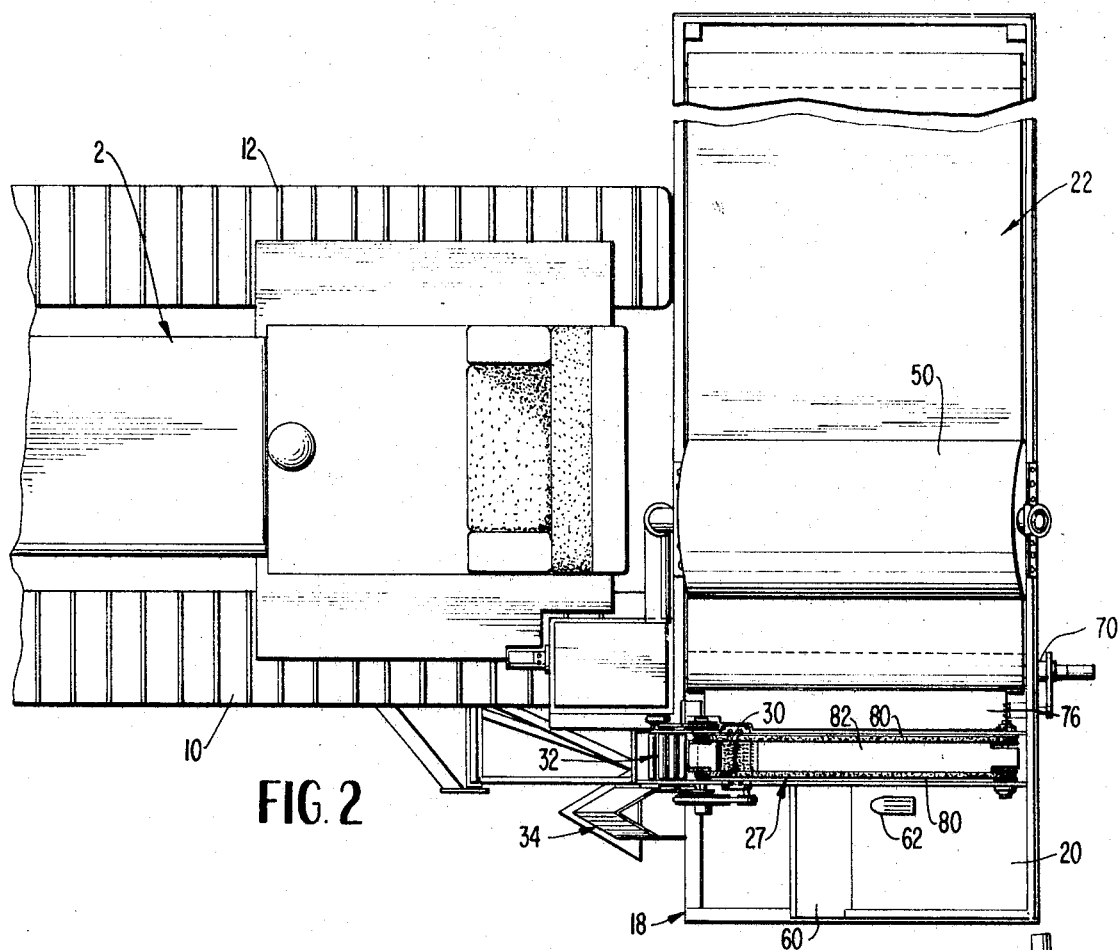
FIGURE 2 is a top view of a portion of the transplanting apparatus shown in FIGURE 1.

Plants are delivered from the left end of the storage conveyor 22 onto a horizontally disposed, stationary plate 76 (FIGURE 2) fixedly secured to the general supporting structure 18. The plate 76 is positioned closely adjacent the left end of the storage conveyor 22 generally on a level with the upper surface thereof, and provides a convenient shelf on which plants delivered from the storage conveyor may be supported in stationary condition until such time as the operator desires to move them onto the adjacent, previously mentioned unbagging conveyor 27.

THE UNBAGGING UNIT

As previously discussed, each of the plants 24 (FIGURE 6) to be transplanted has its root portions surrounded by an individual plug of earth 25 enclosed within a separate container in the form of the bag 26 for each plant. The previously mentioned flap portion 29 is positioned generally centrally of the bottom of the bag spaced from the peripheral edges thereof and folds flat against the bottom of the bag when the plants are stacked on the storage conveyor 22.

The previously mentioned unbagging conveyor 27 (FIGURE 5) comprises two endless flexible belt conveyors 80 having their upper surfaces disposed in horizontal coplanar relation. The conveyors 80 are disposed in transversely spaced opposed relation with their upper surfaces passing over an underlying, longitudinally extending support plate 81 in which is provided the previously-mentioned opening 28. The opening 28 is of less width than the diameter of the cylindrical plug of earth 25 surrounding the roots of each plant. The operator takes plants from the plate 76 and places each plant 24 generally centrally on the conveyors 80 to be supported thereby. The flaps 29 of the associated bags are exposed through the opening 28 as the plants pass successively over the opening.

The conveyor belts 80 at their foward ends are driven at the same speed by equal diameter, transversely spaced, toothed pulleys 84 fixedly mounted in concentric relation on a common drive shaft 86. The rearward ends of the conveyor belts 80 pass over idler pulleys 88 mounted on an idler shaft 90. The toothed pulleys are engaged by correspondingly toothed interior surfaces of the conveyor belts 80 to maintain a timed relation between pulley rotation and belt movement.

The drive shaft 86 is in turn drivingly connected by a belt and pulley train 91 of the toothed type, to the output shaft 92 of an hydraulic motor 94. A one-way clutch 93 is interspersed in the drive train 91 to ensure that the shaft 86 may be rotated in one direction only so that the belts 80 may be driven in only one direction in which the upper surfaces of the belts are moving forwardly. The hydraulic motor 94 is powered by the previously-described engine hydraulic power system and may be selectively controlled to drive the upper surface of the unbagging conveyor 27 in a forward direction.

To strip the bag 26 from the plug of earth 25 about the root portions of the associated plant, the previously-mentioned stripping belts 30 and 31 are provided. The stripping belts each comprises generally vertical, endless flexible belts mounted adjacent the forward end of the unbagging conveyor 27 and extends transversely across the opening 28. The stripper belt 30 is supported in forwardly spaced relation from the stripper belt 31 by upper and lower idler rolls, while the stripper belt 31 is supported at its upper end by an idler roll and at its lower end by a driven roll 100 fixedly secured to the previously-mentioned shaft 92. Each of the stripper belts is provided on its outwardly facing surface with a plurality of outwardly extending, short resilient projections 104.

The forward vertical surface of the stripper belt 31 and the rearward vertical surface of the stripper belt 30 constitute first portions of the stripper belts, disposed in closely spaced adjacent relation. As the shaft 92 rotates to advance the upper surfaces of the conveyor belts 80 forwardly, the forward vertical surface of the stripper belt 102 is concurrently moved downwardly by the driving action of the lower roll 100. The projections 104 on the forward vertical surface of the stripper belt 31 contact the corresponding projections 104 on the rear vertical surface of the stripper belt 30 so that the latter is also moved downwardly.

The upper ends of the stripper belts 30 and 31 are positioned generally on a level with the upper surfaces of the conveyor belts 80, so that as a plant 24 passes overhead the depending flap portion 29 of the associated bag is nipped between the adjacent downwardly moving, vertical surfaces of the stripping belts and pulled downwardly between them. As it is customary to water the plants prior to transplanting, thus making the earth about their roots slippery with respect to the surrounding interior portion of the bag 26, the bag 26 is easily pulled off the plug of earth. The stripped bag is then passed entirely downwardly between the stripper belts and ejected below them. A suitable bag receptacle (not shown) may be provided to receive the stripped bags.

Meanwhile, the remainder of the plant including the root portions and the surrounding plug of earth is prevented from following the stripped bag by the conveyor belts 80 which underlie the outer portions of the plug extending transversely beyond the confines of the opening 28.

After the plant has been unbagged, it is then moved rapidly to the planting station 32 where it is held for subsequent planting. The planting station includes a plurality of rolls 106 drivingly connected in 1:1 gear relation by belts and pulley drive trains 107 connecting each pair of adjacent rolls 106. The direction of rotation of the rollers 106 is such as to cause the upper surfaces of the rollers to be moving in a forward direction when the conveyor belts 80 are moving forwardly. The upper surfaces of the rolls 106 are caused to have a higher peripheral speed than the speed of belts 80 to provide for particularly rapid movement of the unbagged plant to the holding station, by a suitably geared, belt and pulley drive train 108 connecting the drive shaft 86 with one of the rollers 106.

After the plant has been delivered to the planting station 32, operation of the motor 94 is terminated thereby stopping motion of the unbagging conveyor 27 and the planting station rollers 106.

It will be appreciated that significant advantages result from the provision of the unbagging unit in the transplanting apparatus. Importantly, the unbagging unit permits the automatic transplanting of seedlings which have been grown from seed in low-cost plastic bags which must be removed prior to replanting of the seedlings in the field. Utilizing the unbagging unit described, it is no longer necessary to strip the plastic bags from the seedlings by hand with the result that significant labor economies and higher transplanting rates may be achieved.

A second embodiment of the unbagging unit is intended to facilitate the unbagging of plants enclosed in bags of a different configuration, shown in FIGURE 7. This second form of bag includes the previously mentioned body 26 but is provided with two radially projecting vertical flaps 110 positioned diametrically on opposite sides of the body 26. The bag body 26 is further provided with transverse lines of weakness 112 on the base and walls of the body 26 disposed in a central diametrical plane perpendicular to the plane of the flaps 110, for a purpose to be described.

To remove a bag of this second type, two pairs 114 and 116 of stripping belts are mounted on opposite transverse sides of the unbagging conveyor 27. The stripper belts in each of the pairs 114 and 116 are generally of the construction previously described for the first embodiment of the unbagging unit but are mounted with the stripping surfaces of the belts in the two pairs traveling horizontally in opposite transverse directions away from the unbagging conveyor 27.

The plant 24 is placed on the unbagging conveyor 27 by the operator with the flaps 110 extending transversely outwardly of the unbagging conveyor on opposite sides thereof. As the bag passes between the pairs 114 and 116 of stripper belts, the flaps 110 are simultaneously gripped and pulled transversely in opposite directions by the respective stripper belt pairs 114 and 116. This causes the bag to tear transversely apart along the previously mentioned lines of weakness 112 so that the bag is removed from the plug of earth surrounding the roots of the plant.

A third embodiment of the unbagging unit shown in FIGURE 9 is intended for utilization with plants enclosed in bags lacking projecting flap portions of the types previously described but wherein the bag is composed of suitable plastic material which may be readily decomposed by the application of heat. Such materials ideally should decompose without giving rise to substantial combustible products likely to damage the plant and may, for example, include polyethylene or polystyrene. In this third embodiment, the bag is decomposed by heated gas jets directed against the plant through two opposed, horizontal, transversely directed gas nozzles 120 and a vertical underlying gas nozzle 122. The nozzles are supplied with combustible gas through a gas conduit 124 to which the nozzles are connected. Utilizing this arrangement, it is necessary to provide conveyor belt 80 which is adequately resistant to the effects of heating. Additionally, it is necessary to insure that the bag is decomposed sufficiently rapidly by the heat and that the period of application of the heat to the plant is sufficiently short, to avoid damage to the plant roots.

THE PLANT DISPENSING UNIT

An unbagged plant delivered to the planting station 32 is subsequently dispensed therefrom by the previously mentioned plant dispensing member 36 forming part of a plant dispensing unit shown schematically in FIGURE 10.

Drive input to the plant dispensing unit is from a continuously rotating uni-directional hydraulic motor 130 powered by the previously mentioned engine hydraulic system on the tractor vehicle 2. The rotational speed of the hydraulic motor may be varied selectively in order to control the rate of plant delivery during multiple cycle planting to maintain a desired plant spacing, as will be described. An output shaft 131 of the hydraulic motor 130 is connected via a clutch unit 132 to a timing shaft 134.

The clutch 132 is of a commercially available type comprising a cylindrical clutch housing connected for concurrent rotation with the timing shaft 134 and provided with a radially projecting control spur 136. The advancing side of the spur 136 contacts the under side of a rack 138 engaged by a pinion 140. Engagement of the rack 138 with the spur 136 causes spring members within the clutch 132 to be placed in an inoperative condition to decouple the timing shaft 134 from the output of the hydraulic motor 130. When the rack 138 is withdrawn from the spur, the spring members in the clutch 132 causes the clutch 132 to be placed in an operative condition in which the timing shaft 134 is drivingly engaged with the hydraulic motor. Thereafter the timing shaft 134 continues to rotate until the spur 136 next comes into contact with the rack 138 which, in normal operation, is at the conclusion of one complete 360° rotation of the hydraulic motor output shaft 131. In the preferred embodiment the clutch 132 is commercially available from Marquette Metal Products Corporation of Cleveland, Ohio.

To effect movement of the rack 138 to initiate and terminate operation of the clutch 132, a shaft 142 fixedly secured to the pinion 140 extending upwardly therefrom is provided. The shaft 142 at its upper end is fixedly secured to the horizontally extending crank arm 144 which may be moved in an arc about the shaft 142 by a pneumatically operated jack 146. Admission of air to the piston side of the jack 146 moves the crank arm 144 in one direction to rotate the pinion 140 in such a direction as to withdraw the rack 138, thus initiating operation of the clutch 132. The jack 146 is spring returned in the other direction when the air supply to the jack 146 is discontinued, to return the rack 138 to its former position to block the spur 136 and terminate clutch operation when the spur has completed 360° of revolution.

The timing shaft 134 has fixedly secured thereto a driving wheel 148 provided with a boss 150 for intermittently engaging a conventional Geneva gear wheel 152 fixedly mounted on an intermediate shaft 154 disposed in spaced parallel relation to the timing shaft 134. The Geneva gear 152 is a conventional five station Geneva gear wheel which is rotated 1/5 of a revolution for each revolution of the driving wheel 148 by the driver boss 150, thus providing intermittent drive means for the intermediate shaft 154.

The relative dimensions of the wheels 148 and 152 are such that the boss 150 drivingly engages each of the usual slots in the Geneva gear 152 (as shown in FIGURE 11) for the only 108° of revolution of the driver wheel 148. For the remaining 252° of rotation of the driving wheel 148 (during a single revolution controlled by the clutch 132) the Geneva wheel experiences a stationary dwell period in which it is held against rotation by engagement with a cam projection 155 (FIGURE 10) on the driver wheel.

This dwell period, as will be discussed more fully subsequently, is provided to allow sufficient time for an unbagged plant to pass from the stripping belts 30 onto the planting station 32.

The 1/5th of a revolution of driven motion experienced by the Geneva wheel 152 during the time that it is drivingly engaged by the boss 150 of the driver wheel is converted into a full 360° revolution of a drive shaft 156 (FIGURE 10). This is effected by a 5:1 gear train 158 drivingly interposed between the intermediate shaft 154 and the drive shaft 156. The output of the drive shaft 156, as will be described, is utilized to actuate a "Cardan" gear train which moves the previously mentioned plant dispensing member through its operating stroke.

The drive shaft 156 passes rotatably through the center of a stationary sun gear 160 fixedly secured against rotation to portions of the general structure 18. The free rear extremity of the drive shaft 156 is fixedly keyed to a cranked first arm 162. An idler gear 164 rotatably meshing with the sun wheel 160 for movement about the periphery thereof is rotatably mounted on the cranked arm 162 adjacent the mid-point thereof. The idler gear 164 meshingly and drivingly engages a planet gear 166 rotatably mounted on a shaft 168 passing through a remote end of the cranked arm 162. The shaft 168 is fixedly connected and keyed to a second arm 170. At its right end extremity the second arm 170 is connected by a pivot shaft 171 to a drive block 172, guided for horizontal transverse motion by conventional guide structure (not shown).

The ratios of the gear wheels 160, 164 and 166 are chosen to constitute a gear mechanism of the type known to persons skilled in gear mechanisms as a "Cardan" mechanism. The "Cardan" mechanism functions in such a manner that the first 1/2 revolution of the drive shaft 156 causes the block 172 to move in a straight line from an extreme retracted position shown in FIGURE 10 to an extreme advanced position shown in FIGURE 12. The next ½ revolution of the drive shaft 156 causes the drive block to be moved back along the same path to the extreme retracted position.

In the extreme retracted position the drive block 172 is spaced to the right of the drive shaft 156 by a distance generally equal to the sum of the length between the centers of the shafts 156 and 168 and the length between the centers of the shafts 168 and 171. In the extreme advanced position the drive block 172 is spaced to the left of the drive shaft 156 by the same amount.

Summarizing, it will be understood that a "Cardan" gear train of this type provides a substantial rectilinear stroke length for the drive block 172, utilizing a particularly compact arrangement of components.

To transmit the linear motion of the drive block 172 to the previously mentioned plant dispensing member 36, a push rod 174 extending fixedly between the drive block and dispensing member is provided.

The plant dispensing member 36 includes one vertical and generally transversely extending end wall 182 positioned adjacent the forward end of the planting station 32 and a side wall 184 extending rearwardly from the right end of the end wall 182 positioned generally adjacent the right extremity of the planting station 32.

With the plant dispensing member 36 in its retracted position, the forward and right side peripheral portions of the plant are closely adjacent the end and side walls 182 and 184, respectively. When the push rod 174 is at its extreme advanced position, the side wall 184 is moved entirely across the planting station 32 to push the plant from the planting station into the chute 37.

The push rod 174 also extends to the right of the drive block 172 and is provided at its right extremity with a piston 182 forming part of the previously mentioned water pump 53 and functioning in a manner subsequently to be described.

In operation, a pneumatic signal admitting air to the piston side of the jack 146 causes the rack 138 to be withdrawn to free the spur 136. This enables the clutch 132 to engage the timing shaft 134 with the motor 130 to commence a complete 360° revolution. Motion of the timing shaft 134 turns the driving wheel 148, which after a dwell period causes the boss 150 to drivingly engage the Geneva gear 152 for a period of 108° of the driver wheel revolution. During the period of driving motion of the Geneva gear 152, the shaft 154 turns through 1/5th of a revolution which is converted into a complete 360° revolution of the drive shaft 156 by the 5:1 gear train 158. The first half revolution of the drive shaft 156 causes the "Cardan' gear mechanism (comprising the wheels 160, 164 and 166 and the crank arms 162 and 170) to move the plant dispensing member 36 transversely across the planting station to move an unbagged plant waiting on the holding station into the chute so that it is delivered to the furrow and planted. The next half revolution of the drive shaft 156 retracts the plant dispensing member 36 to its initial position.

In order to coordinate the operation of the plant dispensing unit in correct sequence with that of the remainder of the transplanting apparatus, the shaft 134 is also provided with a cam 190 connected through a cam follower 192 to a cam switch 194. The cam switch 194 forms part of certain fluidic circuitry (to be described) for coordinating the operations of the transplanting apparatus.

Although the plant dispensing apparatus has been described with reference to a mechanical arrangement utilizing a "Cardan' gear mechanism, it would equally be possible to move plants from the planting station by the use of other reciprocating devices. For example, a hydraulic or pneumatic jack provided with a reciprocating shaft having a plant pushing attachment could be utilized. Alternatively, it would be possible, for example, to use an electrically powered apparatus such as a reversible electric motor driving a reciprocating rack via a pinion.

THE PLOW AND COVER WHEELS

Prior to delivering a plant from the planting station it is of course necessary to provide a furrow in the ground for the reception of the plant. For this purpose, the previously mentioned plow 34 (FIGURE 13) is provided. The plow 34 is spaced rearwardly and to the left of the left track 12 of the tractor (FIGURE 2) supported by the previously mentioned plow support mechanism 40.

The ground opening, forward surfaces of the plow 34 are provided by two generally vertical downwardly and forwardly inclined plates 200 (FIGURE 13) fixedly connected together along a common leading edge 202 of the plow. The forward plates 200 are inclined rearwardly and transversely outwardly in opposite symmetrical relation from the forward edge 202. Secured to the rearward edges of the plates 200 extending between them is a generally vertical transverse plate 204 for bracing the forward plates in rigid relation. The previously mentioned side plates 38 are fixedly connected to the free vertical edges of the forward plates 200 extending rearwardly therefrom. The side plates 38 prevent collapse of earth back into the furrow dug by the forward plates 200 to keep the furrow open in the area in which the plant is to be received, until the plant has been deposited therein.

To provide for improved root growth of each plant after transplanting, a subsoiler 206 is secured to the forward underside portions of the plow 34. The subsoiler 206 comprises a generally triangular, horizontally disposed flat plate projecting outwardly of the adjacent portions of the plow to undercut the edges of the furrow produced by the forward plates 200. This undercutting action tends to break up the soil so that the roots of the plant may grow more easily into the surrounding earth.

For holding the plow 34 in the ground engaging, operative position and for raising the plow 34 when necessary, the previously mentioned plant support mechanism 40 is provided. The plant support mechanism 40 includes a horizontally disposed, transversely extending, rotatable shaft 210 mounted for rotation about its own longitudinal axis on a bracket 212 connected to adjacent portions of the general supporting structure 18. The rotatable shaft 210 is positioned at a vertical location intermediate the upper and lower portions of the left track 10 of the tractor vehicle and is spaced forwardly of the plow 34. To provide additional support for the rotatable shaft 210 at its outer end, a connecting support 214 is connected between the left end of the shaft 210 and other portions of the general structure 18 forward of the bracket 212. The rotatable shaft 210 is fixedly connected by a three dimensional rigid open work truss 215 to the right, side plate 38 of the plow 34 to provide rigid support therefor. The truss 215 includes an apex portion 216.

When the plow 34 is in a ground engaging operative position extending partially downwardly into the ground to dig a trench, the apex 216 is positioned vertically above, generally transversely centrally of, and a short distance behind the rotatable shaft 210. A pivot connection 218 to the apex 216 of the truss is connected to the piston member 220 of a conventional hydraulic plow jack 222. The cylinder side of the plow jack 222 is connected by a bracket 223 to other portions of the general structure 18.

Hydraulic liquid from the engine driven hydraulic system may be selectively admitted to either the piston side or the rod side of the plow jack 222 to respectively extend and retract the piston member 220. Retraction of the piston member 220 advances the apex 216 of the truss forwardly to rotate the truss 215 about the axis of rotation of the rotatable shaft 210 thus raising the plow 34 above the level of the ground. The plow may be raised to a sufficient height to enable it to pass over any preceding plants in an already planted row. Conversely, extension of the piston member 220 causes the plow 34 to be lowered to the ground engaging position.

When pursuing normal plowing operations, a predetermined hydraulic pressure is maintained on the piston side of the plow jack 222 sufficient to hold the plow in the downward operative position against normal plowing loads. If the plow should strike an embedded obstruction, this would cause a sudden and very rapid pressure increase in the hydraulic pressure on the piston side of the plow jack 222. If this pressure increase could not rapidly be dissipated due for example to the presence of check valves in the fluid supply circuit to the piston side of the jack, very serious damage might be caused. For example, the plow could continue to be held down in contact with the embedded obstruction so that the latter twisted or damaged the plow and the plow support 40, while in addition the high rise in hydraulic pressure could cause possible rupture of the hydraulic jack 222.

To avoid these dangers, an hydraulic safety unit 224 is provided. The hydraulic safety unit 224 comprises a gas filled accumulator connected to the piston side of the plow jack 222 and pressurized to a predetermined gas pressure higher than the hydraulic pressure prevailing on the piston side of the hydraulic jack 222 during normal plowing loads. The escape of gas from the accumulator 224 into the hydraulic jack 222 is prevented by an internal bladder interposed between the gas and oil. A piston type accumulator could be used as well, having a sealed sliding piston interposed within a cylinder between the gas and oil.

In the event of the plow 34 striking an embedded obstruction, pressure on the piston side of the hydraulic jack 222 rapidly rises due to the presence of a check valve 225 (FIGURE 16) in the oil supply system for the jack 222. Because it is a locked circuit, pressure rise increases until it exceeds the preset gas charge pressure in the accumulator 224 causing the gas containing bladder to collapse as the gas is compressed. Escape of the displaced hydraulic liquid into the accumulator 224 permits telescopic collapse of the piston member 220 into the plow jack 222 so that the plow may rise to pass over the embedded obstruction without damage. Immediately after passing the obstruction, pressure demand for holding the plow down is lowered thus allowing the highly compressed gas in the accumulator 224 to force the oil out into the hydraulic jack 222 forcing the plow 34 down.

After each plant has been planted in the furrow produced by the plow, the earth displaced thereby must be replaced about the embedded plant and tamped down. As previously mentioned, the cover wheels 44 are provided for this purpose.

To support the cover wheels, two transversely spaced sets of brackets 230 (FIGURE 13) are fixedly secured to adjacent portions of the general supporting structure 18 on opposite transverse sides of the plow 34, spaced rearwardly therefrom behind the side plates 38. Each of the pairs of brackets 230 rotatably supports one of two aligned, transversely spaced horizontal axle shafts 232. Fixedly secured to each of the axle shafts 232 is one of two rearwardly extending generally horizontal support arms 234. The support arms 234 on opposite sides of the plow converge mutually inwardly in a rearward direction. Each of the support arms 234 at its free rearward end is concentrically provided with one of two fixedly secured stub shafts 236 supporting a yoke 238.

Each of the cover wheels 44 is rotatably mounted within one of the yokes 238. Each cover wheel may be disposed in a plane inclined to the vertical with the wheels converging downwardly and inwardly toward each other by suitable adjustment of the angular relation between the associated stub shaft 236 and horizontal arm 234. The cover wheels 44 each comprises a sheet-like, metal circular outer disc 240 having an inwardly positioned concentric boss 242 of relatively smaller diameter but greater thickness fixedly mounted thereon.

As the cover wheels 44 are dragged behind the vehicle in ground engaging condition, the wheels scoop earth displaced sidewardly out above the furrow by the preceding plow 34, back into the furrow about the plants embedded therein. Additionally, the portions 242 tamp the earth about the plants.

The pressure with which the earth is tamped about the plants may be adjusted by the previously mentioned cover wheel support mechanism 46 connected with the horizontal arms 234. The cover wheel support mechanism 46 includes two hydraulic, cover wheels jacks 250 spaced transversely on opposite sides of the plow rearwardly thereof. Each of the cover wheel jacks 250 includes a vertically extending jack plunger 252 pivotally secured at its lower end to the adjacent one of the support arms 234, extending perpendicularly and vertically upwardly therefrom. The upper cylinder end of each of the cover wheel jacks 250 is pivotally secured to other adjacent portions of the general supporting structure 18.

To coordinate operation of the cover wheel jacks, a common conduit 254 connects the piston sides of the hydraulic jacks 250 adjacent the upper ends thereof. A fluid delivery connection (not shown) is made to the common hydraulic conduit 254 to supply hydraulic liquid thereto from the engine hydraulic system for lowering the cover wheels and for maintaining them held down under a predetermined operating pressure. Other hydraulic connections (not shown) are provided to the rod sides of the cover wheel jacks 250 for retracting the plungers 252 to raise the cover wheels to permit them to pass over plants in a similar manner to that in which the plow may be raised for the same purpose.

To avoid problems of the type previously mentioned arising out of impact between the cover wheels and some substantial, partially embedded obstruction in the ground, another gas filled safety accumulator 256 is connected with the conduit 254. The safety accumulator 256 provides for release of liquid under greater than normal pressures from the piston side of the cover wheel jacks 250 (in a manner similar to that previously described for the plow accumulator 224) to prevent damage of the cover wheels and associated structures by impact with the obstruction.

THE WATER DISPENSING UNIT

At the time each plant is transplanted, it is advisable for horticultural reasons to provide an initial charge of water about the plant. For this reason, the previously mentioned water reservoir 50 (FIGURE 4), water pump 53 and water delivery conduit 52 for delivering water to the furrow in the area adjacent the plant deposited from the planting station, are provided.

The pump unit 53 in more detail (FIGURES 14 and 15), includes a vertically extending tubular pump body 260 interposed in the water conduit 52. Positioned within the pump body 260 is a spaced, concentric, axially extending pump sleeve 262 capable of limited axial motion between upper and lower valve seats 264 and 266, respectively, provided at vertically spaced locations within the pump body 260. Each of the valve seats 264 and 266 comprises an annular constriction in the pump body wall having seating surfaces facing toward cooperating seating surfaces provided on the adjacent ends of the pump sleeve 262.

The pump sleeve 262 is itself provided with axially spaced upper and lower internal valve seats 268 and 270, respectively, spaced inwardly of the adjacent axial ends of the pump sleeve 262. Flow through the upper internal valve seat 268 of the pump sleeve 262 is controlled by an upper internal check valve 271 positioned below the upper internal seat 268 biased upwardly into contact therewith by a compression spring 272 connected to the interior of the pump sleeve. Flow through the lower internal valve seat 270 of the pump sleeve 262 is similarly controlled by a lower internal check valve 274 positioned below the internal valve seat 270 biased upwardly into contact therewith by a compression spring 276 connected to the interior of the pump sleeve.

Communicating with the pump body at about the vertical mid-point thereof between the upper and lower valve seats is a radially extending, tubular, piston housing 280 having a hollow cylindrical bore, communicating with the interior of the pump body 260. The bore of the piston housing 280 receives the piston 182 previously mentioned as being connected to the plant dispensing push rod 174 (See FIGURE 10) in sealing sliding relation. Thus, it will be appreciated that the action of the pump 53 is automatically coordinated with that of the plant dispensing unit in performing the operations to be described.

In operation, as the push rod 174 moves to the left during the first half revolution of the previously mentioned third driven shaft 156 of the plant dispensing unit to dispense a plant from the planting station, the piston 182 is correspondingly moved to the left traveling outwardly of the bore of the piston housing 280. This causes liquid to be drawn into the pump passing downwardly between the upper valve seat 264 and the exterior of the pump sleeve 262 into the piston side of the bore of the piston housing 280. At the same time the check valve 271 is moved downwardly by the incoming fluid so that water passes through the upper, internal valve seat 268 into the interior of the pump sleeve 262, and from there through a plurality of radial openings 284 in the sleeve into the piston side of the piston housing 280.

After the plant has been dispensed, the push rod 174 (as previously described) then commences to return to its retracted position, thus moving the piston 182 to the right to expel water from the piston housing 280. Some of the expelled water passes through the ports 284 into the interior of the pump sleeve 262 at which time the upper internal check valve is spring returned to its closed position against the upper internal valve seat 268. At the same time the increasing pressure within the pump body 260 causes an unbalance of pressure force due to the differential area between the top and bottom of the pump sleeve 262, which causes the pump sleeve to be moved upwardly into seating relation against the upper valve seat 264. Thus, both routes of admission of liquid to the pump 53 are closed off. At this time also the lower internal check valve 274 is forced downwardly by the increased liquid pressure to permit passage of liquid downwardly through the lower internal valve seat 270, to be delivered to the plant. Additionally, upward movement of the pump seat 262 raises the lower end of the pump sleeve off the lower valve seat 266 providing another fluid path for water to escape to the lower part of the conduit 52.

As the cycle of operation of the piston is controlled by the plant dispensing unit on a uniform timing basis, it will be appreciated that the water pumping arrangement described delivers an equal quantity of water to each plant after dispensing. This accurate metering of the water quantity permits a reservoir size no larger than that necessary to provide water for the known maximum plant storage capacity of the transplanting apparatus to be employed. Thus, while avoiding the possibility that operations would be unexpectedly terminated due to running out of water as could occur with a less accurately metered system, it is still possible at the same time to avoid having to utilize a water reservoir of unnecessarily large capacity.

THE FLUIDIC CONTROL CIRCUIT GENERALLY

Operation in a correct sequence of the various sub-systems of the transplanting apparatus thus far described, is coordinated and controlled by a fluidic circuit shown schematically in FIGURE 16.

The circuit will be described with reference to certain standard nomenclature used in fluidic control circuitry. For those not familiar with such circuitry, general background information may be obtained from two series of articles by William S. Bennett in Product Engineering Magazine published by McGraw Hill of New York City, New York, the first series of articles commencing in the issue of January 1962 entitled "Eight Lessons in Binary Logic" and the second in the issue of March 1965 entitled "NOR/NAND Logic". In the description of the following fluidic circuits reference will be made to certain conventional fluidic circuit components defined as follows:

An OR gate includes one or more input ports for fluid pressure signals and one or more output ports. An OR gate has the characteristic that a fluid pressure input signal to any one of the OR gate input ports turns the gate on to provide fluid pressure output signals from all of the OR gate output ports simultaneously.

An AND gate includes one or more input ports for fluid pressure signals and one or more output ports. An AND gate has the characteristic that it requires fluid pressure signal inputs to all of the input ports of the AND gate before the gate is turned on, at which time fluid pressure output signals are provided from all the output ports of the AND gate simultaneously.

A NOR gate includes one or more input ports for fluid pressure signals and one or more output ports. A NOR gate has the characteristic that there is normally a fluid pressure output signal from all the output ports of the NOR gate whenever there is no input signal to any of the input ports of the NOR gate. However, provision of an input signal at any of the input ports to the NOR gate terminates the output signal.

As the pressure signals produced by fluidic amplifiers are of very small magnitude (for example, .2 psi is typical) it is not possible to utilize the signals directly for the actuation of the various services controlled. Therefore, an operation signal from the fluidic circuitry is fed in each case as will be described to an appropriate one of a plurality of conventional air pressure operated pilot valves or actuating units responsive to small pneumatic signals. The pilot valves control the operation of appropriate hydraulic or pneumatic power valves connected respectively to the previously mentioned source of engine hydraulic power and to the main source of pneumatic pressure supplied by previously mentioned air compressor 54. It will further be understood that the fluidic circuit shown in FIGURE 16 derives air pressure for the operation of the various OR, AND and NOR gates from a suitable pressure reducing tapping to the supply of air from the air compressor.

In describing the functioning of the control circuit, each of the various gates will have its inlet and outlet ports numbered as depicted on FIGURE 16 in order to clarify description. Further, it will be understood that an input port of each of the various gates is considered to be in a no-signal condition when the particular port is open to atmosphere.

Referring to FIGURE 16, it will be seen that a pressure line 300 connected with the air compressor 54 through suitable pressure reducing equipment (not shown) is provided. The pressure line 300 may be selectively connected with various of the gates as will be described through various selectively operable switches to provide positive pressure inputs for the gates so that they may provide appropriate control signals for the operation of the apparatus.

OPERATION OF THE FLUIDIC CIRCUIT DURING SINGLE CYCLE TRANSPLANTING

The operation of the transplanting apparatus will be considered first in connection with the selective transplanting of single plants. This may, for example, be performed when replanting diseased or weakened plants in an already planted row of seedlings. In this event, it is necessary for the vehicle to cruise along the row with the plow and cover wheels raised to avoid unearthing healthy plants. When the operator sees a plant that needs to be replaced, it will be necessary to lower the plow to unearth the diseased plant and to provide a furrow into which a replacement plant may be delivered.

For this purpose, the operator initiates operation of the transplanting apparatus by momentary closing of a spring loaded palm button 302 mounted in front of him on the previously mentioned operator's console 60 (FIGURE 3), or alternatively he may momentarily press the previously mentioned spring loaded foot pedal 62. Either of these operations completes a path of fluid communication from the positive pressure line 300 (FIGURE 16) to one or the other of fluid input ports 1 and 3 of a first OR gate, OR (a). This initiates output signals from OR (a) including an output from output port 1 which actuates a pilot valve 304. Actuation of the pilot valve 304 causes a pneumatic power valve 306 to admit air to the piston side of the previously mentioned pneumatic jack 146 forming part of the plant dispensing unit.

Operation of the pneumatic jack 146 (FIGURE 10), as previously described, disengages the rack 138 so that the clutch 132 permits the motor 130 to start rotating the first driven shaft 134 which in turn rotates the cam 190. It will be remembered that once the clutch 132 has started to turn it will continue to rotate for a full revolution even though the operator's subsequent release of the palm button 302 or foot pedal 62 after momentary closing turns off OR (a) thus terminating the signal which caused the rack 138 to be withdrawn.

After the cam 190 has traveled 150 degrees, it is arranged to close the previously mentioned cam switch 194 thus providing a positive pressure input from the pressure line 300 (FIGURE 16) to a second OR gate, OR (g). This immediately initiates a plurality of output signals from the various output ports of OR (g). One of these outputs (from output 3) is connected to an input port (2) of a third OR gate, OR (f). This initiates output signals from the output ports of OR (f), one of which (from output port 2), provides a plow down signal delivered to a first NOR gate, NOR (r). NOR (r) has hitherto been delivering an output signal to a pilot valve 308 controlling a hydraulic valve 309 directing the admission of hydraulic fluid from the engine hydraulic system to the rod side of the previously mentioned plow jack 222, thus holding the plow in the raised condition. However, as OR (f) turn on, it turns NOR (r) off to remove the signal from the pilot valve 308 so that the hydraulic valve 309 is spring returned to switch the hydraulic pressure to the piston side of the plow jack 222. This commences lowering of the plow 34.

At the same time, another of the outputs (1) of OR (f) is connected to one of two inlets of a first AND gate, AND (e), to complete one-half of a plow hold-on circuit. The other half of the plow hold-on circuit is provided by an input signal to the other of the input ports of AND (e) provided by an output (1) from a fourth OR gate, OR (d). The outputs from OR (d) were previously turned on by a signal to input 3 of OR (d) from output 2 of the second OR gate, OR (g), when the cam 190 closed the switch 194. The two inputs thus provided to AND (e) provide an output signal from AND (e) to input 1 of OR (f) which maintains OR (f) in a turned on condition to maintain the plow down signal.

Another function that commences as the cam reaches 150° is operation of the previously mentioned unbagging unit which arises in the following manner. As OR (g) is turned on by the cam switch 194, another of its outputs (6) provides an inlet signal to input port (2) of a fifth OR gate, OR (1). This turns on OR (l) to provide an output connected to an input port (1) of a second AND gate, AND (m). AND (m) will concurrently be receiving its second input signal at input port (2) at this time from the output of a second NOR gate, NOR (o) (unless special circumstances to be described hereinafter prevail). Thus AND (m) is now provided with both its inputs necessary to turn AND (m) on. As AND (m) turns on, it provides an output signal to another pilot valve 312. The pilot valve 312 actuates a hydraulic power valve 314 to deliver hydraulic liquid from the engine hydraulic system to the previously mentioned unbagger motor 94, to turn it in a forward direction.

As the unbagger conveyor 27 (FIGURE 7) rotates, at least one of the plants is moved across the stripping belts 30 and 31 where the bag is removed from the plant after which the plant is advanced to the planting station 32, in the manner previously described.

The Geneva gear 152 (FIGURE 10) is positioned on the timing shaft 134 in such angular relation to the cam 190 (controlling the operation of the unbagging conveyor), that the Geneva gear enters into its period of driven engagement with the boss 150 on the driver wheel 148 at a time shortly after the start of the plow down signal. During the next 54 degrees of angular motion of the timing shaft (as previously described), the plant pushing member 36 is advanced transversely to the left across the planting station to move a plant positioned on the planting station 32 in the last preceding cycle of operation of the device into the chute. The chute grinds the plant into the furrow being dug by the plow 34 which is by now in the fully down position. During the subsequent 54 degrees of timing shaft motion, water is expelled from the conduit 52 about the plant in the furrow by the pump 53 in the manner also previously described.

As the cam 190 reaches the 360 degree position at the conclusion of one full revolution, its further rotation is prevented by impingement of the spur 136 on the clutch on the rack 138. The rack 138 is in the forward position by this time because of the operator's release of the palm button 302 or foot pedal 62 after momentary actuation, previously descussed.

Another function which occurs at the 360 degree position of the cam 190, is that the previously mentioned cover wheels 44 commence to be moved down. This occurs in the following manner. The cover wheels 44 are still raised, in which position they maintain closed a spring loaded cover wheel switch 315 (FIGURE 16) which provides a signal input to input port 4 of OR (d) which is kept turned on to provide one of the necessary inputs to AND (e). The other necessary input to AND (e) is provided by the previously described feedback from output 1 of OR (f), so that AND (e) still provides an output to keep OR (f) turned on. However, OR (f) includes an output (3) supplying one or two input signals to a fourth AND gate, AND (j). AND (j) has hitherto been switched off by reason of a lack of input signal to its other input (2) from a fourth NOR gate, NOR (i). However, when OR (g) turns off when the cam switch 194 releases, an output signal from output (4) of OR (g), which has thus far been applied to NOR (i), ceases. As this signal to NOR (i) ceases, NOR (i) turns on, thus providing the other input signal to AND (j) to turn that on. As AND (j) turns on, it provides an input signal to a sixth OR gate, OR (k). OR (k) then provides an output from one of its ports (1) which operates another pilot valve 316 connected to an air power valve 318 which is thereby turned on. The air supplied by valve 318 is fed to a gas accumulator 320 for a purpose to be described and simultaneously to a fifth pilot valve 322. This pilot valve 322 then causes an hydraulic power valve 324 to switch to direct hydraulic liquid from the engine hydraulic source to the piston side of the previously mentioned cover wheel jacks 250 to commence lowering the cover wheels 44.

As the cover wheels 44 start to move downwardly, the plow 34 is concurrently signalled to raise. This is achieved by causing the cover wheels as they move down to release the cover wheel controlled spring switch 315 which, as discussed, in its closed condition has hitherto been providing an input signal to inlet (4) of OR (d). As this was by now the only remaining input to OR (d), (OR (g) and OR (a) having been turned off as described OR (d) is turned off. As OR (d) turns off, it removes one of the two inputs to AND (e) which is turned off, thus turning off OR (f). As OR (f) turns off, NOR (r) once again commences to provide an output signal to the previously mentioned pilot valve 308 which switches the hydraulic valve 309 to supply the hydraulic liquid to the rod side of the plow jack 222 to raise the plow 34.

At the same time, the plow 34 is signalled to rise, motion of the unbagging unit also ceases since it too is maintained by the cover wheel controlled spring switch 315 which, as discussed, in its closed condition has hitherto been providing an input signal to inlet (4) of OR (d). As this was by now the only remaining input to OR (d), (OR (g) and OR (a) having been turned off as described, OR (d) is turned off. As OR (d) turns off, it removes one of the two inputs to AND (e) which turned off, thus turning off OR (f). As OR (f) turns off, the output 4 to OR (l) inlet 1 turns off so as to remove one of the inputs to AND (m) which also turns off. As AND (m) turns off, the signal to the pilot valve 312 is removed so that the hydraulic valve 314 closes thus terminating the supply of hydraulic liquid to the unbagger motor 94 which ceases to turn.

Although further movement of the timing cam 190 within the plant dispensing unit has now ceased, it is necessary to provide a control function to ensure that the cover wheels 44 are held down for a sufficient period for the earth to be closed about the plant in the furrow. This function is achieved as follows: As OR (f) becomes turned off following the opening of the cover wheel switch 315, the input signal to AND (j) from OR (f) is correspondingly turned off, thus turning off OR (k) which in turn removes the signal to the pilot valve 316 and the air valve 318. However, there is no outlet path for the air within the accumulator 320 which hence continues to maintain signal pressure to the pilot valve 322 which continues to operate the hydraulic valve 324 to deliver hydraulic liquid to the piston side of the cover wheel jack 250 to hold down the cover wheels. However, gas may be permitted to escape from the accumulator 320 at a slow rate through a normally closed exhaust valve 326 when the exhaust valve 326 is opened by a pilot valve 328. As AND (j) turned off, thus turning off OR (k), this removed the only then existing input to inlet 1 of a fourth NOR gate, NOR (q). NOR (q) then immediately commences to provide an output signal initiating operation of the pilot 328 to open the exhaust valve 326. After a predetermined period of time determined by the exhaust characteristics of the exhaust valve 326, the pressure in the accumulator 320 drops to a level below that necessary to maintain activation of the pilot valve 322. At this time, the hydraulic valve 324 changes its position to deliver liquid to the rod side of the cover wheel jack 250 to raise the cover wheels.

OPERATION OF THE FLUIDIC CIRCUIT DURING MULTIPLE CYCLE TRANSPLANTING

During the transplanting of plants on a cyclically repetitive basis such as planting a fresh row of plants, it is necessary to maintain the plow and cover wheels permanently down while feeding plants into the ground at regular intervals. This necessitates various changes in the operation of the system from that previously described.

To initiate multiple cycle transplanting, the operator closes a switch 340 positioned on the console 60 which connects the pressure line 300 to inlet (2) of OR (a) which is turned on. OR (a) from outlet (1) provides a pressure signal to operate the pilot 304 as before to withdraw the rack 138 to initiate driving of the shaft 135. However, with the switch 340 remaining closed, the rack remains permanently withdrawn from the clutch so that the shaft 134 rotates continuously instead of being cut off at the end of one revolution as during the single cycle of planting previously described. Thus, planting proceeds with one plant being delivered from the planting station 32 for each revolution of the shaft 134. The rate at which plants are delivered is controlled by adjustment of the variable speed motor 130. To plant seedlings at a uniform row spacing, a particular ground speed for the vehicle 2 is selected, and the speed of the motor 130 is then adjusted to deliver as many plants per minute (at one plant per revolution) as is necessary to provide the desired plant spacing at the selected vehicle speed.

During multiple planting it is, of course, necessary to ensure that the plow and cover wheels do not become raised at the conclusion of every 360 degrees of cam revolution in the manner previously described for single cycle planting.

To prevent the plow 34 from thus being raised, a seventh OR gate, OR (b) and a fifth AND gate, AND (c) are provided. OR (b) receives an input signal at input (2) from output 3 of OR (a) which is held on by the switch 340. This turns on OR (b) which provides one input to AND (c). The other input signal for AND (c) is supplied by a fifth NOR gate, NOR (h) when the cam reaches 360 degrees. At this time, OR (g) is turned off in the manner previously described for single cycle operation but NOR (h), which is connected to output (1) of OR (g), then turns on so that AND (c) is also turned on. One output (2) of AND (c) is utilized to provide an input signal for input 2 of OR (d) to maintain energization of the plow down signal through AND (e), OR (f) and NOR (r). Another output (1) from AND (c) is utilized as feedback signal to input (1) of OR (b) to provide a hold on circuit in case switch 340 should be released during the middle of a cycle.

As mentioned, it is also necessary to maintain the cover wheels 44 in the down position during multiple cycle transplanting operations. This is achieved by connecting output 4 of OR (a) to input (3) of NOR (q) so that as long as the switch 340 remains closed there is a permanent input signal to NOR (q) keeping it in a permanently turned off condition. So long as NOR (q) is turned off there can be no signal to the pilot 328 to open the exhaust valve 326. Thus, the locked in pressure supplied by the accumulator 320 maintains the pilot valve 322 in a permanently operative condition to cause the cover wheels 44 to be kept in a down condition.

The operations of the unbagging unit, the plant dispensing unit and water dispensing unit continue to function during each repetitive cycle of the cam 190 in the manner previously described for the single cycle operation.

In a very significant aspect of the invention, it will be realized that the fluidic circuit thus far described permits operation of the transplanting apparatus on either a single cycle or multiple cycle basis, as desired. Significantly, the use of fluidic control circuitry provides for extremely reliable operation under the rather severe environmental conditions under which transplanting machines generally function.

MANUAL OVER-RIDE OPERATIONS UTILIZING THE FLUIDIC CIRCUIT

In addition to the automatic control functions previously described, various manual over-rides are provided to permit selective control of individual sub-systems of the transplanting apparatus when this is desired.

To permit the plow to be selectively lowered when necessary, a plam button 342 located on the console 60 is provided for connecting the pressure line 300 directly to NOR (r). When the palm button 342 is pressed, NOR (r) is turned off causing the plow jack 222 to move the plow 34 down as previously described. When the palm button 342, which is spring loaded to an open position, is released, the plow returns to the raised position.

The cover wheels 44 may also be selectively lowered by operation of a palm button 344 spring loaded to an open position and also located on the operator's console 60. Closing the palm button 344 connects the pressure line 300 to inlet 2 of OR (k), which is thus turned on. As OR (k) turns on, outlet (1) thereof signals the pilot valve 316 with the result that the cover wheels 44 are moved down and the accumulator 320 charged in the manner previously described. Simultaneously, output 2 of OR (k) supplies an input to input (1) of NOR (q), which is turned off, thereby causing the pilot 328 to close the exhaust valve 326 so that the accumulator maintains the pressure on the pilot valve 322. When the palm button 344 is released, the outputs from OR (k) turn off so that NOR (q) turns on to signal the pilot 328 to open the exhaust valve which permits the accumulator to exhaust after a predetermined time delay so that the wheels are then raised, as before.

It is also sometimes desired to selectively run the unbagging conveyor 27 in a forward direction to build up an accumulation of plants on the unbagging conveyor, or for recycling any missed plants, or for inspection of the conveyor 27 and stripping belts 30 and 31. For this purpose, another palm button 346 spring loaded to an open position is provided on the console 60. When the palm button 346 is pressed, the pressure line 300 is connected to input (2) of OR (l), which energizes AND (m), and causes forward motion of the unbagger motor 94 in the manner previously described.

There are, however, other times when it is desired to run the unbagger and stripper belts in a reverse direction for the purposes such as cleaning out soil, roots, bags and the like from between the stripper belts, and for safety purposes. To provide for reverse running, an unbagger reverse palm button 348, spring loaded to an open position, is also provided on the operator's console 60. Closing of the palm button 348 connects the pressure line 300 to an input (1) of an eighth OR gate, OR (n). OR (n) turns on to provide one output signal to the inlet of previously mentioned NOR (o) which is correspondingly turned off. As NOR (o) turns off, one of the inputs to AND (m) is turned off so that AND (m) cannot thereafter be energized by a signal from OR (l). At the same time, an output signal from outlet (2) of OR (n) is applied to a pilot valve 350 connected with an hydraulic valve 352 to supply hydraulic fluid to the unbagger motor 94 in a reverse direction to cause the unbagger motor 94 to run in reverse, so that the unbagger motor 94 is caused to drive the stripper belts 30 and 31 in a backward direction. Such reverse motion is not imparted to the conveyor belts 80 by reason of the previously mentioned one-way clutch 93.

The storage conveyor 22 may also be selectively moved to advance its upper surface in a leftward direction by pressing either one of two storage conveyor palm buttons 354 and 356, respectively. The palm button 354 is located on the previously mentioned operator's console 60 so that the operator may advance conveyor 22 while standing at the operator's station. The other storage conveyor forward palm button 356 is located on the frame 18 adjacent the rear edge of the conveyor 22, so that when the operator is standing to the rear of the conveyor to load plants thereon the palm button 356 is conveniently positioned for him to operate the conveyor 22. Each of the palm buttons 354 and 356 connects the pressure line 300 to the input ports of a ninth OR gate, OR (p) to turn it on. The output from OR (p) operates a pilot valve 358 to actuate a hydraulic valve 360 to supply hydraulic fluid to the previously mentioned storage conveyor motor 70 to advance the upper surface of the storage conveyor to the left.

SUMMARY OF ADVANTAGES

It will be appreciated that in utilizing the method and apparatus of the present invention for transplanting plants, certain significant advantages are provided.

Very importantly, the invention renders economically possible the use of low-cost plastic bags for transplanting seedlings, by providing for automatic mechanical stripping of the bags from the seedlings before they are placed in the earth. In this manner, the need for manual removal of the bags, which has hitherto sometimes increased the cost of the operation to such an extent as to offset the low-cost advantages provided by the use of plastic bags, is obviated.

Other very significant advantages are provided by the fluidic control circuitry for controlling the various transplanting operations. Importantly, the fluidic circuitry described permits the transplanting apparatus to be operated with equal facility either for multiple cycle planting of fresh rows, or for single cycle planting such as may be necessary, for example, to replace individual plants in a row.

In either mode of operation the operator is required only to press a palm button or switch to initiate a completely automatic cycle of operation in which either single or multiple planting is effected as required.

It should particularly be noted that the single cylce of operation which is initiated by simple pressure on a single switch automatically controls a sequence of operations comprising several different steps of lowering the plow, stripping a bag from a plant, feeding the plant into a furrow produced by the plow, providing water for the plant, closing the earth about the plant and of raising the plow. All of these operations are performed automatically and in sequence without requiring further control operations on the part of the operator.

In addition, the provision of the several manual over-ride controls incorporated in the apparatus permits selective special operations of the apparatus to be effected as necessary.

Other advantages are provided by the safety units associated with the plow support mechanism and the cover wheel support mechanism for ensuring that sudden impact of either the plow or the cover wheels with an obstruction embedded in the ground does not cause damage to the transplanting apparatus.

Also significant is the watering system which is coordinated with the plant dispensing system in such a manner that water is only dispensed at times when a plant has just been delivered to the ground. Furthermore, the water dispensing system provides for an equal amount of water to be delivered on each cycle of operation so that the water storage capacity of the transplanting apparatus may be accurately matched to the total plant dispensing capacity of the transplanting apparatus. It is additionally noteworthy that this accurate water dispensing system is achieved without the use of relatively expensive rotary pumping apparatus.

Although the invention has been described with reference to certain preferred embodiments, it will be appreciated by those skilled in the art that many modifications, substitutions, deletions, additions and other changes not specifically enumerated or described may be made which will fall within the purview of the appended claims.

We claim:

1. A method of removing containers from plants having root portions surrounded by an individual plug of earth in discrete containers comprising the steps of:
   a) conveying the plants from a first station through a container removal station to a second station along a substantially linear route; and
   b) removing the container from each plant without manipulation of the plug of earth during passage of the plant along the predetermined linear route through the container removal station.

2. The method of Claim 1 wherein the predetermined route is substantially horizontal.

3. The method of Claim 2 wherein the container is downwardly removed from the plant.

4. The method of Claim 2 further wherein the container is laterally separable with respect to the predetermined route and wherein the container is removed by lateral separation.

5. The method of Claim 2 wherein the container is readily decomposed by the application of heat and wherein the container is removed from the plant by the application of heat.

6. In a method of transplanting plants of the type wherein each plant includes root portions surrounded by an individual plug of earth enclosed within a separate container comprising the steps of:

a) providing vehicle means adapted for motion along the ground and having a water reservoir;
b) storing a plurality of the plants in separable containers on the vehicle means;
c) conveying the plants from storage through a container removal station to a planting station on the vehicle means along a predetermined route;
d) removing the container from each plant without manipulating the plug of earth during passage of the plant along the predetermined route through the container removal station;
e) providing an opening in the ground;
f) conveying the plant from the planting station on the vehicle means into the opening provided in the ground;
g) dispensing a quantity of water from the reservoir on the vehicle means to the plant in the opening in the ground; and
h) refilling the opening in the ground about the plant with earth.

7. Container removal apparatus comprising:
a frame;
a first station on said frame;
a second station on said frame;
a third station on said frame;
means carriedly by said frame for conveying plants each having a root portion surrounded by earth and enclosed within a discrete container along a substantially linear route from said first station to said third station through said second station; and
means for removing the container from said plants while at said second station without manipulation of the earth surrounding the root portion.

8. The apparatus of Claim 7 wherein said conveying means comprises a pair of spaced, parallel conveyors and wherein the container is removed from said one plant between said conveyors.

9. The apparatus of Claim 8 wherein said container includes a flap adapted to depend between said conveyors and wherein said container removing means includes flap gripping means adjacent said conveyors and movable away therefrom whereby the container is removed from said one plant.

10. The apparatus of Claim 7 wherein said containers are readily decomposed by the application of heat and wherein said container removing means includes means adjacent said conveyors for applying heat to said containers at said second station.

11. The apparatus of Claim 10 wherein said heat applying means includes a plurality of gas jets each directed at a different portion of the containers when at said second station.

12. The apparatus of Claim 7 wherein said containers include flap means protruding laterally with respect to said route on opposite sides thereof and a weakened portion intermediate said flap means; and
wherein said container removal means includes laterally separable means on opposite sides of said conveying means for gripping said flap means whereby the container is separated along said weakened portion and removed from said one plant.

13. A transplanting apparatus comprising:
vehicle means adapted for motion along the ground;
a planting station on said vehicle means at which plants delivered to said planting station may be planted in the ground;
a storage station on said vehicle means adapted to store a plurality of the plants each including root portions surrounded by an individual plug of earth enclosed within a separate container;
conveying means carried by said vehicle means for conveying one of said plants independently of others of said plants from said storage station to said planting station along a predetermined substantially linear path;
container removing means carried by said vehicle means adjacent said conveyors for removing the container from said one plant during the conveyance thereof along said path without manipulation of the plug of earth;

ground opening means carried by said vehicle means for producing an opening in the ground;

means for conveying said one plant into said opening; and covering means carried by said vehicle means for refilling earth into said opening about said one plant.

14. The apparatus of Claim 13 wherein said ground opening means includes a plow adapted to produce a furrow in the ground upon movement of said vehicle means along the ground and means for raising and lowering said plow respectively between a position above the ground and an operative position in which said plow extends into the ground to produce the furrow.

15. The apparatus of Claim 14 further including plow safety unit means comprising plowing load sensing means and for permitting upward deflection of said plow from said operative position in response to plowing loads above a predetermined value.

16. An apparatus as defined in Claim 14 wherein said plow raising and lowering means includes: a hydraulic jack connected between said plow and said vehicle means, a source of hydraulic liquid, and a hydraulic inlet conduit communicating with said source and with one end of said hydraulic jack to supply hydraulic liquid thereto to maintain said plow in said operative position under normal plowing loads, said conduit having a one-way valve; and wherein said plow safety unit means includes: a source of gas pressurized to a relief pressure higher than the hydraulic pressure in said inlet conduit under normal plowing loads, and means responsive to the pressure in said inlet conduit for permitting passage of hydraulic liquid into said gas source.

17. The apparatus of Claim 13 including:

reservoir means carried by said vehicle means;

conduit means for conducting water from said reservoir means to a point adjacent said planting station and for directing water into said opening; and water dispensing means interposed in said conduit means and responsive to movement of said one plant along said route for dispensing a quantity of water through said conduit means to said opening.

18. The apparatus of Claim 13 wherein said covering means includes:

a pair of inwardly and downwardly inclined covering wheels adapted to engage the ground on opposite sides of said opening;

means for raising and lowering said covering wheels between a position above the ground and an operative position in engagement with the ground; and safety means for permitting upward deflection of said covering wheels responsive to the exceeding of normal loading by a predetermined value.

19. The apparatus of Claim 18 wherein said ground opening means includes a plow adapted to produce a furrow in the ground upon movement of said vehicle means along the ground and means for raising and lowering said plow respectively between a position above the ground and an operative position in which said plow extends into the ground to produce the furrow; and including reservoir means carried by said vehicle means;

conduit means for conducting water from said reservoir means to a point adjacent said planting station and for directing water into said opening; and water dispensing means interposed in said conduit means and responsive to movement of said one plant along said route for dispensing a quantity of water through said conduit means to said opening.

20. The apparatus of Claim 18 wherein said covering wheel raising and lowering means includes a source of hydraulic fluid, a hydraulic jack connected between said covering wheels and said vehicle means, and a hydraulic inlet line having a one-way valve connected with said source and with one end of said hydraulic jack for supplying hydraulic fluid thereto to maintain said covering wheels in said operative position under normal loads; and wherein said safety means includes a source of gas pressurized to a relief pressure higher than the hydraulic pressure in said hydraulic jack during normal loads, and check valve means connecting said gas accumulator and said hydraulic inlet line for preventing passage of gas from said accumulator into said hydraulic inlet line while permitting passage of hydraulic fluid into said accumulator when said relief pressure is exceeded.

21. In a transplanting apparatus of the type including a vehicle adapted for motion across the ground and having a plow, a plow mechanism for raising and lowering the plow between a position above the ground and an operative position engaging the ground to dig a furrow upon motion of the vehicle, a plant storage area, a unit for dispensing plants into the furrow, a covering unit, a reservoir, and a cover unit mechanism for raising and lowering the covering unit between a position above the ground and an operative position engaging the ground to refill the furrow with earth, a control system carried by the vehicle comprising:

timing means for performing a predetermined timing cycle concluding with termination of operation of said timing means;

selectively operable means for initiating a cycle of said timing means;

first control means responsive to the initiation of a cycle of said timing means for operating said plow mechanism to lower the plow;

second control means responsive to said timing means for transferring plants to the furrow;

third control means responsive to said second control means for operating said cover unit mechanism to lower the cover unit for the duration of a cycle of said timing means and to operate said first control means to raise the plow; and fourth control means responsive to the operation of the plant dispensing unit for operating the water dispensing means to deliver a measured quantity of water to the plant dispensed.

22. The control system of Claim 21 including:

means for causing said timing means to continuously repeat the operation of the timing cycle;

first hold-on means responsive to said fourth control means and said operation repeating means for maintaining said first control means in a continuously operative condition whereby the plow is continuously lowered; and second hold-on means responsive to said cover control means for maintaining continuous operation thereof during operation of said operation repeating means whereby the cover unit is continuously lowered.

23. The control system of Claim 21 wherein said plow mechanism, said plant dispensing unit and said cover unit mechanism each contain actuating units responsive to fluid pressure signals, and wherein each of said control means includes a fluidic circuit for generating fluid pressure signals.

24. A watering and plant dispensing system comprising:

a vehicle adapted for motion along the ground;

a plant storage unit carried by said vehicle;

a planting station carried by said vehicle from which plants may be moved to the ground;

intermittently operated conveying means carried by said vehicle for conveying a plant from the storage unit to the planting station upon each operation of said conveying means;

a reservoir carried by said vehicle;

conduit means in fluid communication with said reservoir extending downwardly therefrom to a position near the ground;

a reciprocating pump interposed in said conduit means and responsive to said plant moving means for pumping a uniform quantity of water from said reservoir through said conduit means;

selectively operable timing means carried by said vehicle for performing a predetermined timing cycle upon each selective operation of said timing means, said timing means being responsive to said conveying means for initiating one operation of said conveying means at a predetermined point in said timing cycle; and plant moving means carried by said vehicle for removing a plant from the planting station to the ground subsequent to operation of said conveying means, said means including a plant pushing member for movement along a predetermined path across said planting station and moving means connected with the plant pushing member for advancing and retracting the plant pushing member along said predetermined path, said moving means being responsive to said timing means at a second predetermined point in said timing cycle sufficiently delayed from said first predetermined point to allow said one plant to have reached the planting station.

25. The system of Claim 24 wherein said pump includes:
a tubular pump body having upper and lower valve seats communicating with said conduit means;
a displaceable pump sleeve concentrically mounted within and spaced from said pump body moveable axially between said upper and lower valve seats into separate sealing contact therewith;
a piston housing communicating with the interior of said pump body extending outwardly therefrom intermediate said upper and lower valve seats; and
a piston slidably and sealingly mounted in said piston housing, said piston being directly connected with portions of said plant moving means to be moved outwardly of said piston housing during an outward stroke of said plant moving means in which a plant is moved from the planting station, said piston being moved inwardly of said piston housing upon a return stroke of said plant pushing means, said pump sleeve being initially seated on said lower seat to permit water to be drawn into said pump body and said piston housing during the outward movement of said piston, said pump sleeve upon inward movement of said piston being moved upwardly into sealing contact with said upper valve seat to close off the entry of further water into said pump body and to permit the water in said piston housing to be expelled through said lower valve seat to the ground.

26. The system of Claim 25 wherein said pump sleeve further includes:
upper and lower internal valve seats adjacent upper and lower ends of said pump sleeve and communicating with the interior thereof;
port means communicating radially intermediate said upper and lower internal valve seats between the interior of said pump sleeve and said pump body; and
resiliently biased, downwardly moveable, upper and lower internal check valve means biased upwardly into closing contact with said upper and lower valve seats respectively.

27. The system of Claim 24 wherein said timing means includes:
a timing cam and a timing shaft connected therewith for moving said timing cam through one revolution at selected intervals; and wherein said plant moving means includes:
an intermediate shaft;
intermittent gear train means connecting said timing shaft and said intermediate shaft in driving relation for a fraction of each revolution of said timing shaft to rotate said intermediate shaft through a fraction of one revolution;
a drive shaft;
step-up gear train means connecting said drive shaft with said intermediate shaft to cause a complete revolution of said drive shaft upon each said fraction of a revolution of said intermediate shaft; and
linearly acting gear train means connected with said drive shaft and with said plant pushing member to cause a complete advance and retraction stroke thereof upon each revolution of said drive shaft.